US008598482B2

(12) United States Patent
Bonnell et al.

(10) Patent No.: US 8,598,482 B2
(45) Date of Patent: Dec. 3, 2013

(54) INTELLIGENT BARCODE SYSTEMS

(75) Inventors: Clayton Bonnell, Fairfax, VA (US);
Jeffrey L. Freeman, Purcellville, VA (US); Michael Lyons, Port Saint Lucie, FL (US); Stephen M. Dearing, Herndon, VA (US); Margaret Louise Choiniere, Gainesville, VA (US); Daryl S. Hamilton, Upper Marlboro, MD (US); Himesh Patel, Centerville, VA (US); Carla Fern Sherry, Annadale, VA (US); David James Payne, Collierville, TN (US)

(73) Assignee: United States Postal Service, Washington, DC (US)

( * ) Notice: Subject to any disclaimer, the term of this patent is extended or adjusted under 35 U.S.C. 154(b) by 240 days.

(21) Appl. No.: 12/405,139

(22) Filed: Mar. 16, 2009

(65) Prior Publication Data

US 2010/0230328 A1    Sep. 16, 2010

(51) Int. Cl.
*B07C 5/00* (2006.01)

(52) U.S. Cl.
USPC .......................................... 209/584; 700/223

(58) Field of Classification Search
USPC .......... 209/584, 900; 700/213, 221, 222, 223, 700/224, 225, 226, 227
See application file for complete search history.

(56) References Cited

U.S. PATENT DOCUMENTS

| | | | |
|---|---|---|---|
| 4,796,196 A | 1/1989 | Durst, Jr. et al. |
| 4,800,505 A | 1/1989 | Axelrod et al. |
| 4,831,555 A | 5/1989 | Sansone et al. |
| 4,979,605 A | 12/1990 | Svyatsky |
| 5,005,124 A | 4/1991 | Connell et al. |
| 5,079,714 A | 1/1992 | Manduley et al. |
| 5,161,109 A | 11/1992 | Keating et al. |
| 5,229,932 A | 7/1993 | Connell et al. |

(Continued)

FOREIGN PATENT DOCUMENTS

| | | |
|---|---|---|
| EP | 0 673 686 A1 | 9/1995 |
| EP | 1 022 691 A2 | 7/2000 |

(Continued)

OTHER PUBLICATIONS

U.S. Postal Service, Confirm Service Featuring OneCode Confirm: Publication 197 (Mar. 2008).

(Continued)

*Primary Examiner* — Joseph C Rodriguez
(74) *Attorney, Agent, or Firm* — Knobbe Martens Olson & Bear LLP

(57) ABSTRACT

Systems and methods using intelligent barcodes for processing mail, packages, or other items in transport are provided. Systems and methods allowing end-to-end visibility of a mail stream by uniquely identifying and tracking mail pieces are also provided. Systems and methods include the use of standardized intelligent barcodes on mail pieces, a seamless process for mail acceptance, continuous mail piece tracking, and feedback on mail quality in real time. In one embodiment, systems and methods using intelligent barcodes allow a mailing service to provide enhanced acceptance, sorting, tracking, address correction, forwarding, and delivery services. In another embodiment, systems and methods using intelligent barcodes allow a mailing service to identify a mail piece as undeliverable-as-addressed (UAA) and determine a final disposition for the mail piece. In yet another embodiment, systems and methods using intelligent barcodes allow mailers more visibility into the mail stream and information on the quality of their mailings.

28 Claims, 14 Drawing Sheets

(56) References Cited

U.S. PATENT DOCUMENTS

| | | | |
|---|---|---|---|
| 5,319,181 | A | 6/1994 | Shellhammer et al. |
| 5,420,403 | A | 5/1995 | Allum et al. |
| 5,422,821 | A | 6/1995 | Allen et al. |
| 5,470,427 | A | 11/1995 | Mikel et al. |
| 5,514,863 | A | 5/1996 | Williams |
| 5,612,889 | A | 3/1997 | Pintsov et al. |
| 5,682,429 | A | 10/1997 | Cordery et al. |
| 5,703,783 | A | 12/1997 | Allen et al. |
| 5,731,574 | A | 3/1998 | Bodie et al. |
| 5,770,841 | A | 6/1998 | Moed et al. |
| 5,781,634 | A | 7/1998 | Cordery et al. |
| 5,790,429 | A | 8/1998 | Baker et al. |
| 5,862,243 | A | 1/1999 | Baker et al. |
| 5,871,288 | A | 2/1999 | Ryan, Jr. et al. |
| 5,925,864 | A | 7/1999 | Sansone et al. |
| 5,930,796 | A | 7/1999 | Pierce et al. |
| 5,953,427 | A | 9/1999 | Cordery et al. |
| 5,984,174 | A | 11/1999 | Kato et al. |
| 6,032,138 | A | 2/2000 | McFiggans et al. |
| 6,055,520 | A | 4/2000 | Heiden et al. |
| 6,125,357 | A | 9/2000 | Pintsov |
| 6,131,101 | A | 10/2000 | Maitino et al. |
| 6,175,827 | B1 | 1/2001 | Cordery et al. |
| 6,178,411 | B1 | 1/2001 | Reiter |
| 6,178,412 | B1 | 1/2001 | Ratzenberger, Jr. et al. |
| 6,253,219 | B1 | 6/2001 | Gardner et al. |
| 6,269,344 | B1 | 7/2001 | Junger |
| 6,292,709 | B1 | 9/2001 | Uhl et al. |
| 6,311,104 | B1 | 10/2001 | Shea et al. |
| 6,370,446 | B1 | 4/2002 | Divine |
| 6,371,521 | B1 | 4/2002 | Petkovsek |
| 6,385,504 | B1 | 5/2002 | Pintsov et al. |
| 6,457,012 | B1 | 9/2002 | Jatkowski |
| 6,532,452 | B1 | 3/2003 | Pintsov et al. |
| 6,536,659 | B1 | 3/2003 | Hauser et al. |
| 6,549,892 | B1 | 4/2003 | Sansone |
| 6,557,000 | B1 | 4/2003 | Seestrom et al. |
| 6,680,783 | B1 | 1/2004 | Pierce et al. |
| 6,741,724 | B1 | 5/2004 | Bruce et al. |
| 6,826,548 | B2 | 11/2004 | Hungerpiller et al. |
| 6,865,561 | B1 | 3/2005 | Allport et al. |
| 7,085,811 | B2 * | 8/2006 | Sansone et al. ............... 709/206 |
| 7,328,085 | B2 * | 2/2008 | Fogel et al. ................... 700/227 |
| 7,346,591 | B2 * | 3/2008 | Sansone ........................ 705/410 |
| 7,647,231 | B2 | 1/2010 | Kuebert et al. |
| 7,734,729 | B2 | 6/2010 | Du et al. |
| 2001/0010334 | A1 | 8/2001 | Park et al. |
| 2002/0029202 | A1 | 3/2002 | Lopez |
| 2002/0143431 | A1 * | 10/2002 | Sansone ........................ 700/226 |
| 2002/0147731 | A1 | 10/2002 | Seestrom et al. |
| 2006/0080266 | A1 | 4/2006 | Kiani et al. |
| 2006/0271236 | A1 * | 11/2006 | Rosen et al. ................... 700/221 |
| 2008/0269946 | A1 | 10/2008 | Kiani et al. |
| 2009/0057207 | A1 * | 3/2009 | Orbke et al. ................... 209/584 |
| 2009/0143898 | A1 * | 6/2009 | Kiani et al. .................... 700/226 |

FOREIGN PATENT DOCUMENTS

| | | |
|---|---|---|
| JP | 7-171505 A | 7/1995 |
| JP | 2000-334389 A | 12/2000 |
| KR | 2001-0064264 | 7/2001 |
| WO | WO 00/10113 A1 | 2/2000 |

OTHER PUBLICATIONS

U.S. Postal Service, Intelligent Mail Barcode Technical Resource Guide (Apr. 10, 2008).
U.S. Postal Service, Intelligent Mail Barcode Guide (Jun. 2008).
Federal Register Notice, Implementation of New Standards for Intelligent Mail Barcodes, 73 Fed. Reg. 49,333 (Aug. 21, 2008).
U.S. Postal Service, A Guide to Intelligent Mail for Letters and Flats (Dec. 2008).
Address Change Service Application, Address Change Service Department, National Address Information Center.
Letter from U. S. Postal Services addressed to Honorable Thomas C. Sawyer, Nov. 24, 1993.
Letter from U.S. House of Representatives addressed to Honorable Marvin Runyon, Oct. 5, 1993.
Letter from U.S. Postal Service addressed to Managers Sales (Area), Dec. 20, 1994.
Letter from U.S. Postal Service, Customer and Automation Service Department, Aug. 28, 1991.
Letter from U.S. Postal Service, National Customer Support Center, Aug. 8, 1996.
Postal Automated Redirection System—The USPS Solution, 13th International Conference on Postal Automation, May 23-28, 1999.
The Federal Register, vol. 62, No. 60, pp. 15055-15065, Mar. 28, 1997.
United States Postal Service, Your Guide to Address Change Services, DD. 1-25, May 1, 1991.
United States Postal Service, Address Change Service, Addendum to Publication 8 Address Change Service, Publication 8, Sep. 1998.
United States Postal Service, Address Change Service, Creative Solutions for Your Business Needs, News Briefs, Publication 8, Jul. 1990.
United States Postal Service, Address Change Service, Third-Class Address Change Service, Sep. 13, 1988.
United States Postal Service, Draft Information-Based Indicia Program (IBIP) Performance Criteria for Information-Based Indicia and Security Architecture for Closed IBI Postage Meterina Systems (PCIBI-C), Jan. 12, 1999.
United States Postal Service, National Customer Support Center, Move Update, pp. 1-12, Apr. 1997.
United States Postal Service, Postal Bulletin, Second-Generation Address Change Service, PB 21798, Sep. 19, 1991.
United States Postal Service, The Mailroom Companion, vol. 2, No. 2, pp. 1-8, Feb. 1997.
Supplemental Information Disclosure Statement filed on Nov. 9, 2009, in U.S. Appl. No. 90/008,470.
Supplemental Information Disclosure Statement filed on Apr. 29, 2009, in U.S. Appl. No. 90/008,470.
Supplemental Information Disclosure Statement filed on Jul. 16, 2008, in U.S. Appl. No. 90/008,470.
Supplemental Information Disclosure Statement filed on Apr. 14, 2008, in U.S. Appl. No. 90/008,470.
Supplemental Information Disclosure Statement filed on Nov. 21, 2007, in U.S. Appl. No. 90/008,470.
Supplemental Information Disclosure Statement filed on Jun. 29, 2007, in U.S. Appl. No. 90/008,470.
Information Disclosure Statement filed on Jan. 31, 2007, in U.S. Appl. No. 90/008,470.

* cited by examiner

INTELLIGENT BARCODE SYSTEMS

BACKGROUND

1. Field

This development relates to a barcode and methods and systems of processing mail pieces using the barcode.

2. Description of the Related Technology

Mailers that use the mail delivery systems typically apply barcodes to their mail pieces to help the mailing system sort, track, and deliver mail pieces. Conventionally, mailing systems offer automation discounts for mailers that place barcodes on their mail pieces. In addition to offering automation discounts, mailing systems can provide additional services to meet the business needs of mailers. Mailers, and in particular business mailers, typically want to know where their mail is in the mail stream, how it is being processed by the mailing system, when their mail pieces are delivered, and how complete and accurate their addresses are. Mailers also seek access to more data about their mail pieces as they travel through the mail stream. Mailing services seek such data to monitor processing, improve services, reduce costs, and accurately calculate postal charges. Hence, improved acceptance, sorting, tracking, and delivery systems and processing methods using barcode technologies are desirable.

SUMMARY OF CERTAIN INVENTIVE ASPECTS

The system, method, and devices of the development each have several aspects, no single one of which is solely responsible for its desirable attributes. Without limiting the scope of this development as expressed by the claims which follow, its more prominent features will now be discussed briefly. After considering this discussion, and particularly after reading the section entitled "Detailed Description of Certain Embodiments" one will understand how the features of this development provide advantages that include reduced mailing costs for mailers, reduced processing costs for mailing services, greater visibility into the mail stream for mailers, and a greater number of mail pieces reaching their intended destination.

One embodiment is a computerized method. The method includes sorting mail, where sorting includes reading an encoded value located on a mail piece; decoding the encoded value to determine an identification of a class of the mail piece and an identification of a service type of the mail piece; and performing an operation in response to determining that the mail piece is an actual undeliverable as addressed mail piece. The operation includes determining a final disposition of the mail piece using at least one of the identification of the class of the mail piece and the identification of the service type of the mail piece derived from the encoded value. In another embodiment, sorting includes decoding the encoded value to determine an identification of a delivery point for the mail piece, and the operation includes determining a final disposition of the mail piece using the identification of the delivery point and at least one of the identification of the class of the mail piece and the identification of the service type of the mail piece derived from the encoded value.

Another embodiment is a ma chine-read able medium including instructions which when executed by a machine causes the machine to perform operations. The operations include sorting mail for a mail piece, where sorting includes reading an encoded value located on the mail piece; decoding the encoded value to determine an identification of a sender of the mail piece, an identification of a recipient of the mail piece, an identification of a class of the mail piece, an identification of any endorsements of the mail piece, and an identification of a delivery point for the mail piece; and determining whether the mail piece is a candidate undeliverable as addressed mail piece using the identification of the recipient of the mail piece within the encoded value and the identification of the delivery point for the mail piece. Sorting also includes performing an operation in response to determining that the mail piece is a candidate undeliverable as addressed mail piece. The operation includes retrieving a name of the recipient of the mail piece using the identification of the recipient of the mail piece within the encoded value; retrieving a return address of the sender of the mail piece using the identification of the sender of the mail piece within the encoded value; confirming that the candidate undeliverable as addressed mail piece is an actual undeliverable as addressed mail piece, using the name of the recipient of the mail piece; and determining final disposition of the mail piece using at least one of the identification of the class of the mail piece within the encoded value or the identification of any endorsements of the mail piece from the encoded value.

Still another embodiment is an apparatus. The apparatus includes a database to store a number of entries, where each of the number of entries include a name of a recipient of mail and an identification associated with the name of the recipient. The apparatus also includes a mail sorter to read an encoded value located on a candidate undeliverable as addressed mail piece. The encoded value includes an identification for the recipient of the candidate undeliverable as addressed mail piece, an identification of a class of the candidate undeliverable as addressed mail piece, and an identification of any endorsements of the candidate undeliverable as addressed mail piece. The mail sorter retrieves from the database a name of the recipient of the candidate undeliverable as addressed mail piece from an entry of the number of entries, where the entry includes the identification for the recipient of the candidate undeliverable as addressed mail piece. The mail sorter confirms that the candidate undeliverable as addressed mail piece is an actual undeliverable as addressed mail piece, using the name of the recipient of the candidate undeliverable as addressed mail piece. The mail sorter also determines final disposition of the confirmed undeliverable as addressed mail piece using at least one of the identification of the class within the encoded value and the identification of any endorsements within the encoded value.

DETAILED DESCRIPTION OF THE PREFERRED EMBODIMENT

Figure 1:
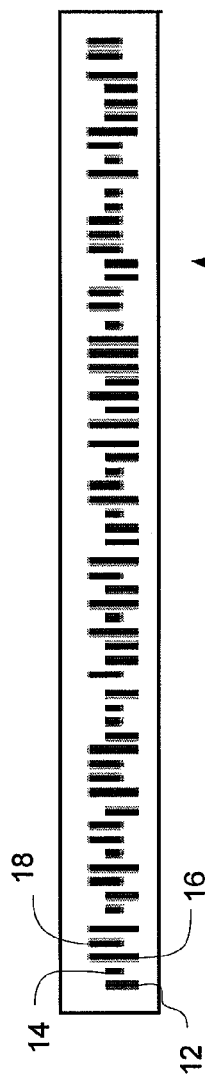
FIG. 1 illustrates an intelligent barcode used in one embodiment of a mailing system.

The following detailed description is directed to certain specific embodiments of the development. However, the development can be embodied in a multitude of different ways as defined and covered by the claims. In this description, reference is made to the drawings wherein like parts are designated with like numerals throughout.

Embodiments of the development can provide end-to-end visibility of a mail stream by uniquely identifying and tracking mail pieces, then using this visibility to enable a seamless process for mail acceptance. Embodiments of the development can include such features as, but not limited to, the use of standardized intelligent barcodes on mail pieces, continuous mail piece tracking, and feedback on mail quality in real time. Individually or in combination, systems according to embodiments of the development can optimize mail acceptance and delivery processes.

In one embodiment, a mail processing system enables pieces of mail processing equipment located at various mailing service locations to continuously scan and track mail pieces from acceptance through delivery. In another embodiment, a mailer sends electronic manifest information that describes its mailing to the mailing service before the mailing is transported to the mailing service and inducted into the mail stream. In yet another embodiment, the mailing service sends back a confirmation and an estimate of postage to the mailer based on the pre-shipment notification. In still another embodiment, scheduling information is exchanged electronically between the mailer and the mailing system. In a further embodiment, as mail pieces arrive at a mailing service location, the mailer receives induction information providing a true "start the clock" data point to measure and assess the delivery process. In another embodiment, mail pieces are seamlessly accepted by the mailing service, and processed using intelligent barcodes as described herein. In yet another embodiment, processing using intelligent barcodes allows real-time mail validation to occur. In still another embodiment, mailers immediately receive feedback on the quality of their mail, on barcode quality, and on the location and final disposition of their mail pieces in the mail stream. In a further embodiment, a mail processing system provides address quality measurements that are transmitted to mailers, enabling them to update mailing lists. In yet a further embodiment, integration of the mail processing system with financial systems allows payments and adjustments to be performed electronically and automatically.

Persons of skill in the art will understand that mailing systems are but one embodiment of the development, and described herein for purposes of disclosure. Mailing systems, methods, and processes as described herein can be broadly interpreted to include, for example, shipping systems; warehouse receipt, storage, and delivery systems; and baggage handling systems. Similarly, mail pieces as described herein can be broadly interpreted to include, for example, bags in a baggage handling system, packages in a shipping system, shipping containers in a long distance transport system, and objects in a warehousing system.

An Intelligent Barcode

FIG. 1 illustrates an intelligent barcode 10 that can be used in systems according to an embodiment of the development. An intelligent barcode 10 can be affixed on a mail piece and used to sort and track the mail piece. In one embodiment, the intelligent barcode 10 is printed directly on an outer surface of the mail piece. In another embodiment, the intelligent barcode 10 is stamped directly on an outer surface of the mail piece. In yet another embodiment, a mailer prints the intelligent barcode 10 on a label, then affixes the label to an outer surface of the mail piece. In still another embodiment, the mailer prints intelligent barcode 10 on a piece of correspondence, then inserts the correspondence inside an envelope such that the intelligent barcode 10 is visible through a clear or see-through window in the envelope. In one embodiment, the window is covered with clear cellophane and the intelligent barcode 10 is visible through the cellophane. The intelligent barcode 10 can be used with any mail piece having such a window, not just envelopes. In addition to sorting and tracking systems, intelligent barcode 10 can also be used in other systems and methods described herein.

Figure 2:
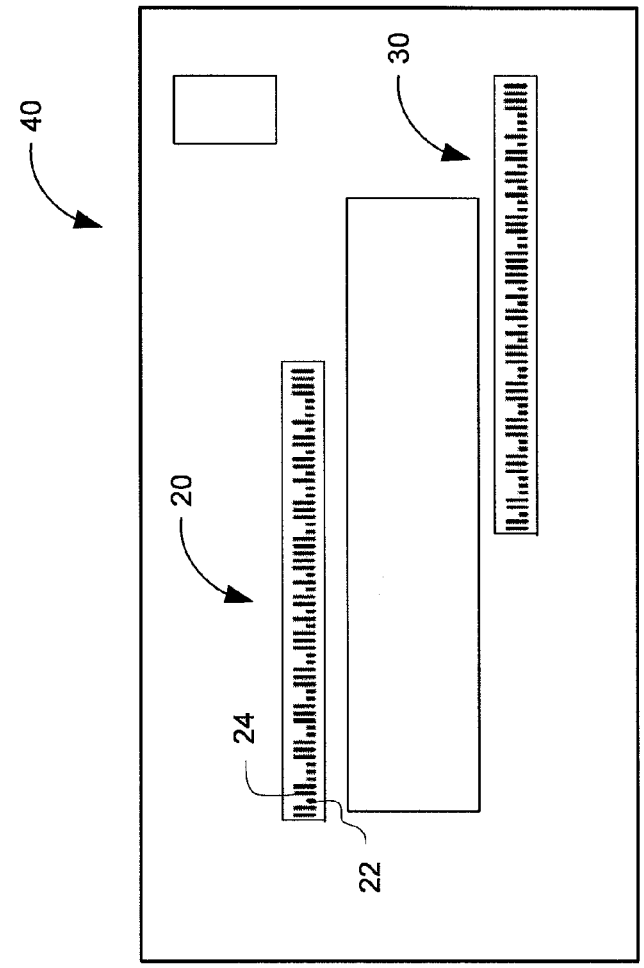
FIG. 2 illustrates prior art barcodes used in one embodiment of a mailing system.

FIG. 2 illustrates an example of prior art barcodes 20, 30. The barcodes 10, 20 are optical machine-readable representations of data. Like barcodes of the prior art, the intelligent barcode 10 illustrated in FIG. 1 is height-modulated, in which the data representation consists of evenly spaced bars of varying height. The prior art barcode 20 illustrated in FIG. 2 is a two-state barcode, however, in which data is encoded using two types of bars—short bars 22 and tall bars 24. Unlike the prior art barcodes, the intelligent barcode 10 in one embodiment of the development is a four-state barcode, in which data is encoded using four types of bars. In the embodiment illustrated in FIG. 1, the four bar types are descender bars 12, tracker bars 14, full bars 16, and ascender bars 18.

The intelligent barcode 10 may be designed for use in high-speed, automated mail sortation machines. In some embodiments, information contained in multiple prior art barcodes such as the barcode 20 can be combined into a single intelligent barcode 10. For example, referring to FIG. 2, the barcode 20 may be configured to include tracking information, while the barcode 30 may be configured to include sorting information. A mailer may place both barcodes on a single mail piece 40 to allow the mailing service to sort the mail piece when it is first introduced into the mailing system, as well as allow the mailing service and the mailer to track the mail piece along its route to an ultimate destination. Sorting information can include, for example, a ZIP™ Code, which can be used to determine a delivery point mailing address. Tracking information can generate, for example, mail piece processing data used for tracking purposes when the mail piece is processed on automated mail processing equipment. Because this same tracking and sorting information can be combined into one intelligent barcode 10, one barcode can be used for both mail sorting and tracking. Using one intelligent barcode instead of two prior art barcodes can free up more open space on the mail piece 40, save printing costs such as but not limited to ink costs, and simplify production.

In addition to the capability to combine data from multiple barcodes, the intelligent barcode 10 may offer expanded data capacity compared with prior art barcodes. This expanded data capacity can include, for example, expanded tracking capabilities. The current data capacity of prior art barcodes will first be described.

Figures 3, 3A:
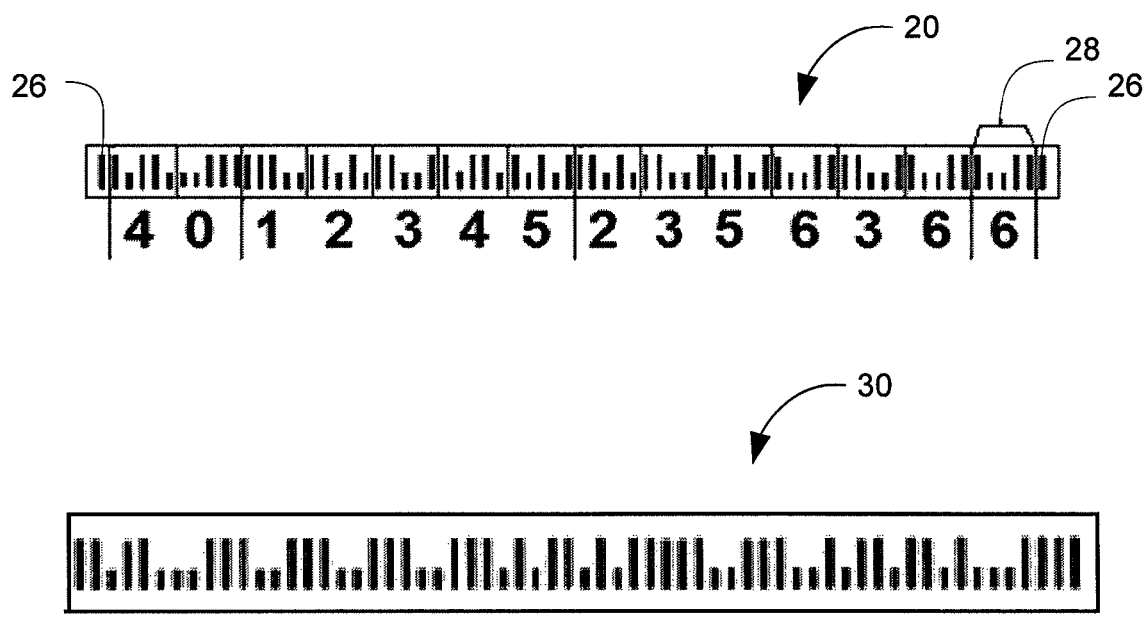
FIG. 3 illustrates the prior art barcodes of FIG. 2 in greater detail.
FIG. 3A is a table translating the prior art barcodes of FIG. 2 into digits.

Referring now to FIG. 3, the prior art barcodes 20, 30 contain human readable representations of numerical digits. In one embodiment, the barcode 20 is a thirteen-digit barcode that can be used in combination with the barcode 30, another thirteen-digit barcode, to uniquely identify the mail piece 40. The barcodes may begin and end with frame bars 26. The barcodes 20 and 30 can include any number of digits, including but not limited to 11 or 13 digits.

As shown in table 45 illustrated in FIG. 3A, one combination of five tall and short bars represents the digit 0, a different combination of five tall and short bars represent the digit 1, and so on to digit 9. The barcodes 20 and 30 may use different combinations of short bars 22 and tall bars 24 to represent the same digits, or, as demonstrated in the embodiment illustrated in table 45, the digit symbology for the barcode 20 may be the inverse of the digit symbology for the barcode 30. The barcodes 20, 30 may also include a check-sum digit 28 configured to detect errors in the barcodes.

The types of data that can be represented in the barcodes 20, 30 will now be described in further detail with reference to the barcode 20 illustrated in FIG. 3. Following the framing bars 26, the first two digits in the barcode 20, "40," can represent data such as, but not limited to, the service type and the class/shape of the mail. Service types can include, for example, First-Class Mail, Standard Mail, and Periodical Mail. The class/shape of the mail can include, for example, letters, flats, and cards. Thus, in one embodiment, the first two digits can represent a Service Type Identification (ID) for the mail piece. A Service Type ID of "40" can represent First-Class Mail letters, while a Service Type ID of "43" can represent Standard Mail flats in one example.

The next five digits in the barcode 20, "12345," can identify a mail preparer, a mail owner, a subscriber to a particular mailing system service, or a system for sending mail. In one embodiment, this number is a Subscriber ID assigned by the mailing service to a subscriber to identify that a particular mail piece was mailed by a particular subscriber. Further, the subscriber's particular tracking and handling preferences can be stored in records kept by the mailing service. In some embodiments, these preferences or settings can be used to identify the particular handling a mail piece should receive. Systems to match a particular mail piece with a particular mailer and the mailer's preferences will be described in greater detail below.

The next six digits in barcode 20, "235636," can be made available to the mailer to use for identification purposes. The number may be used to identify a particular mail piece, client, or account, for example. Mailers can use these six digits in combination with the barcode 30 to identify the mail piece uniquely. The last digit, "6," represents a check sum or correction character to detect errors in the barcode. In some embodiments, the check sum digit is the single-digit number (0 to 9) that, when added to the sum of the other digits in the barcode 20, results in a whole number that is a multiple of 10.

Figure 4:
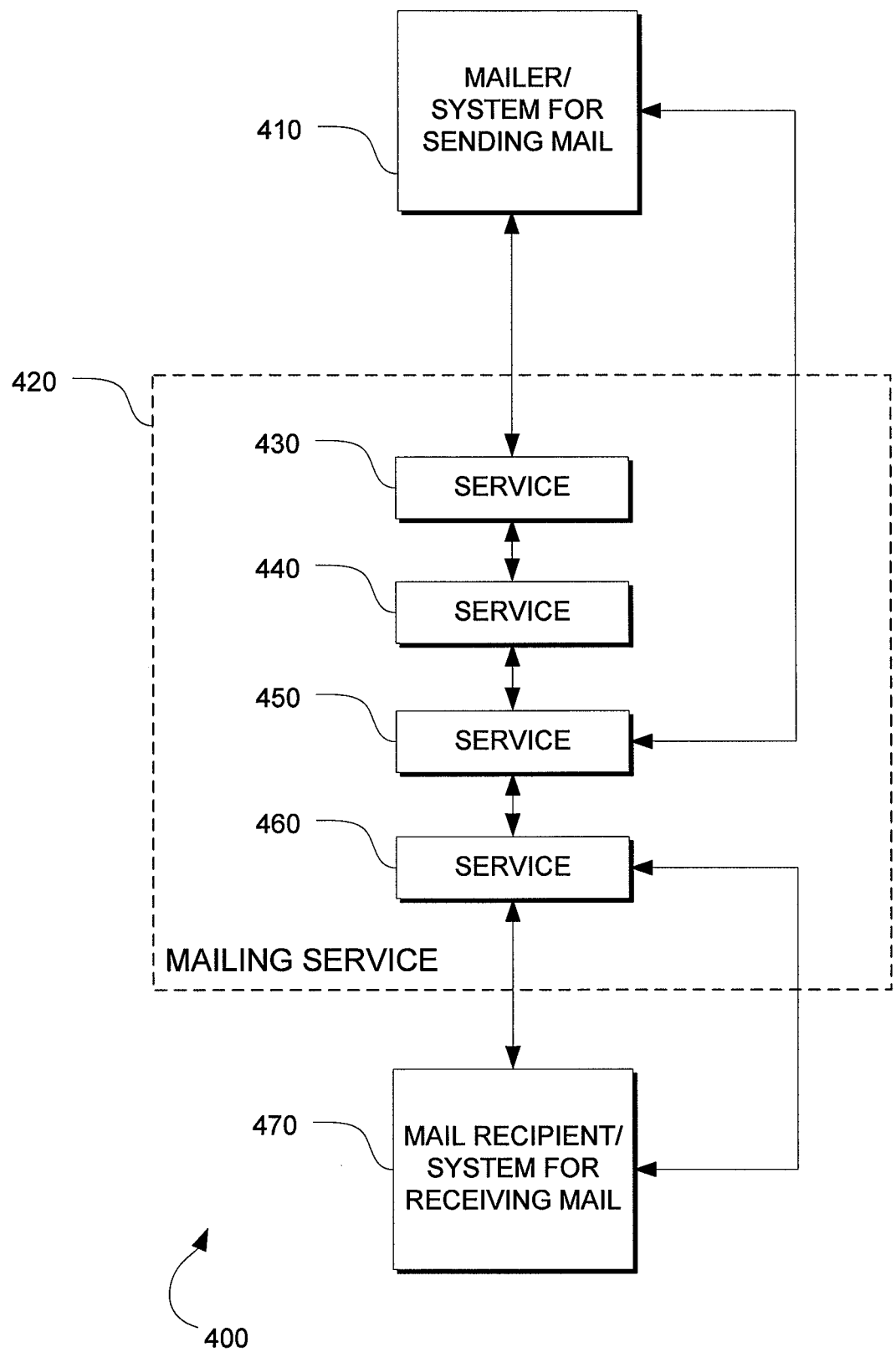
FIG. 4 is a top level block diagram illustrating one embodiment of a mailing system using barcodes such as those illustrated in FIGS. 1 and 2.

FIG. 4 is a top level block diagram illustrating one embodiment of a mailing system 400 using barcodes such as the intelligent barcode 10 and barcodes 20, 30. A mailer 410 transmits mail pieces to a mailing service 420. In one embodiment, the mailer 410 transmits a mail piece to the mailing service 420 in order for the mailing service 420 to deliver the mail piece to a mail recipient 470. The mailer 410 is not limited to mail preparers and mail owners, and can include a system for sending mail. Systems for sending mail can include, for example, presort mailers who perform automated processing of mail pieces from multiple mail owners or customers. These systems can receive mail in batches from different customers, combine and sort the batches to obtain postage discounts, then transmit the combined mailing to the mailing service 420. The mailer 410 may also transmit data or other information to the mailing service 420, in addition to transmitting a mailing to the mailing service 420. In one embodiment, the mailing service 420 transmits mail pieces back to the mailer 410. In another embodiment, the mailing service 420 transmits data or information back to the mailer 410, indicating, for example, receipt of a mailing.

The mailing service 420 can be configured to perform various services on mail transmitted by the mailer 410. Such services are represented by service modules 430, 440, 450, and 460. Services can include but are not limited to sorting, tracking, address correction, mail return, mail forwarding, and mail delivery services. The service modules 430, 440, 450, and 460 can transmit entire mailings or individual mail pieces to a different service module. In one embodiment, a service module can transmit one or more mail pieces back to the mailer 410. In the embodiment illustrated in FIG. 4, the service module 450 transmits one or more mail pieces to the mailer 410. In another embodiment, a service module, such as but not limited to the service module 450, transmits data or other information to the mailer 410. Such data or other information can include for example, information on a service that is planned to be performed, is currently being performed, or has been performed on one or more mail pieces. Similarly, the mailer 410 can transmit data or other information directly to the service module 450, or any other suitable service module included in the mailing service 420.

In one embodiment, the mailing service 420 delivers mail pieces or a mailing to the mail recipient 470. The mail recipient 470 is not limited to individuals or businesses, and includes systems for receiving mail. Academic institutions, hospitals, prisons, and other facilities may encompass such systems for receiving mail, for example. In one embodiment, the mailing service 420 transmits data or other information to the mail recipient 470, including but not limited to data or information on mail pieces scheduled to be delivered to the mail recipient 470. In another embodiment, the mail recipient 470 transmits mail pieces or a mailing to the mailing service 420. The mailing recipient 470 may also transmit data or other information to the mailing service 420. In yet another embodiment, the mailing service 420 transmits data or information to the mailing recipient 470, indicating, for example, receipt of a mailing from the mailing recipient 470. In yet another embodiment, a service module, such as but not limited to the service module 460, transmits data or other information to the mail recipient 470. Similarly, the mail recipient 470 can transmit data or other information directly to the service module 460, or any other suitable service module included in the mailing service 420.

Figure 5A:
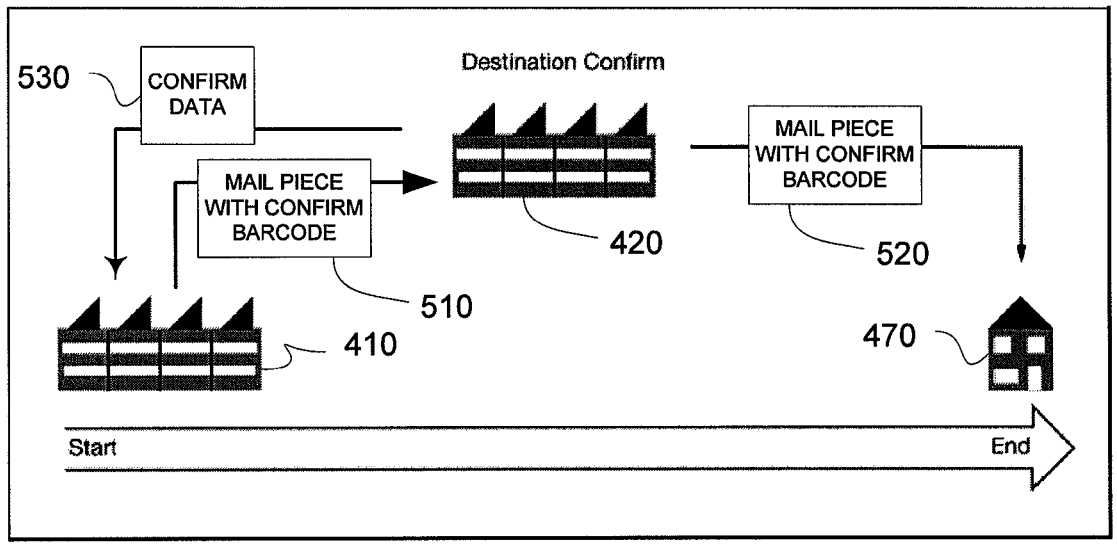
FIGS. 5A, 5B are system diagrams of services offered by the mailing system of FIG. 4 according to one embodiment.

FIG. 5A illustrates a system diagram of one embodiment of a destination confirm service 500, which uses the mailing system 400 and the configuration of digits described above with respect to the barcode 20 to confirm a mail piece has reached a particular destination. In the embodiment illustrated in FIG. 5A, the mailing service 420 provides a "destination confirm" service 500 to the mailer 410. The system starts when the mailer 410 affixes a barcode 20 to a mail piece in a mailing (not illustrated). The barcode indicates destination confirm service is requested for the mail piece. The mailer 410 then transmits the mail piece to the mailing service 420 at block 510. The mail piece is processed at the mailing service 420 (not illustrated). At block 520, the mailing service 420 delivers the mail piece to the mail recipient 470 indicated on the mail piece. As part of the destination confirm service 500, the mailing service 420 additionally confirms to the mailer 410 at block 530 that the mail piece has been delivered to the mail recipient 470. In one embodiment, the mailing service 420 confirms delivery by sending information to the mailer 410. In another embodiment, the information is an entry in a computer database system the mailer 410 can access to determine the status of its mailings. In yet another embodiment, the information includes an image from a mail processing equipment (MPE) scan. Systems to track a mail piece and notify a mailer 410 that a mail piece has reached its destination will be described in greater detail below.

Figure 5B:
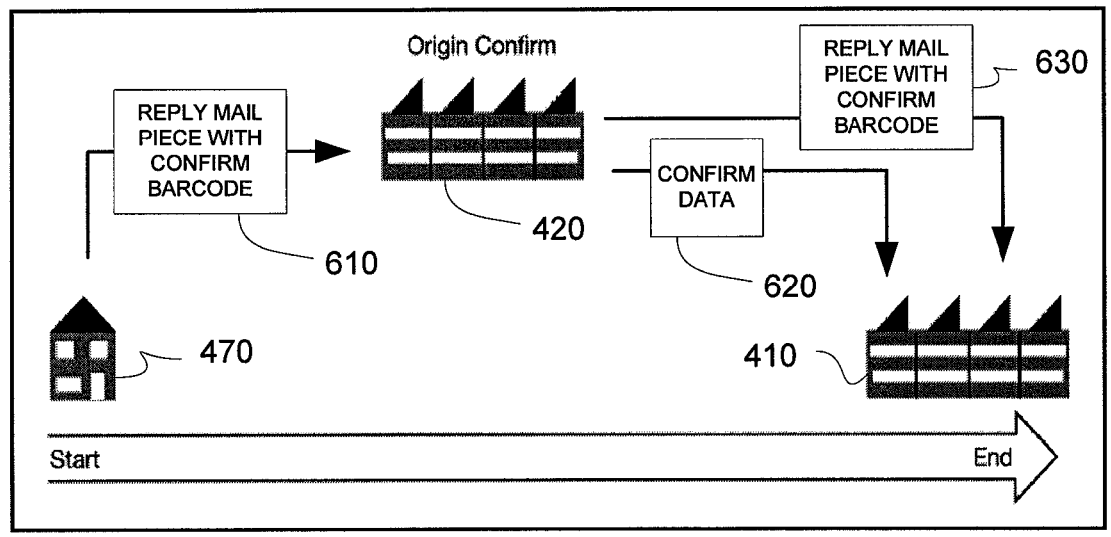

The digits in the barcode 20 are not limited to those described above, and can represent any number of pieces of data for use in different tracking and notification systems. For example, the barcodes 20, 30 may be used by the mailing service 420 to inform a mailer 410 that a piece of reply mail has entered the mail stream and is enroute to be delivered to the mailer 410. The piece of reply mail can include, for example, a payment, order, or other response from a customer. In one embodiment, the mailing service 420 provides an "origin confirm" service 600 to the mailer 410. FIG. 5B illustrates a system diagram of one embodiment of an origin confirm service 600. The system starts at block 610 when the mail recipient 470 mails a reply mail piece bearing a preprinted origin confirm barcode 20 and a preprinted barcode 30. In one embodiment, the mail recipient 470 previously received a mailing from the mailer 410 that included the replay mail piece bearing the preprinted barcodes. The mail recipient 470 may be a customer of the mailer 410, for example.

The mailing service 420 next processes the reply mail piece (not illustrated). In one embodiment, the mailing service 420 identifies during processing that the barcode 30 and the origin confirm barcode 20 are printed on the piece of reply mail. In another embodiment, the mailing service 420 associates the mailer 410 with the reply mail piece by the barcodes 20, 30 preprinted on the reply mail piece. In yet another embodiment, the mailer 410 registers a series of separate 9- or 11-digit barcodes 30 to which it plans to mail reply mail pieces bearing origin confirm barcodes 20. The 9- or 11-digit barcode 30 can include ZIP™ Codes, for example. In one embodiment, the mailing service 420 allows the mailer 410 to register up to 200 9- or 11-digit ZIP™ Codes to which the mailer 410 plans to mail Origin Confirm reply mail pieces bearing origin confirm barcodes 20.

The mailing service 420 next notifies the mailer 410 at block 620 that a mail piece with a specific origin confirm barcode 20 and barcode 30 has been inducted into the mail system. In some embodiments, the first two digits of an origin confirm barcode 20 may represent a Service Type ID, the next 11 digits may be for the mailer 410's use to identify the customer or other mailer of the reply mail piece, and the last digit may be a check sum digit. At block 630, the mailing service 420 delivers the mail piece to the mailer 410.

Similarly, the barcode 30 can represent any number of pieces of data useful in sorting mail, such as, but not limited to a ZIP™ Code or an entire delivery point mailing address.

The expanded data and tracking capability of the intelligent barcode 10 will now be described in greater detail with reference to FIG. 1. Unlike the prior art barcodes 20, 30, the intelligent barcode 10 does not contain human readable representations of numerical digits. In one embodiment, the intelligent barcode 10 represents data in a fixed-length array of 31 digits. An encoding algorithm translates these 31 digits into a series of 65 bars, as illustrated in FIG. 1. In another embodiment, the inverse of the intelligent barcode symbology illustrated in FIG. 1 is used to create a different symbology. Mailers 410 who use the intelligent code 10 on their mail pieces can, for example, obtain encoding software that can print intelligent barcodes. Once the mail pieces are inducted into the mail system 400, these intelligent barcodes 10 can then be scanned by, for example, automated mail processing equipment. Once scanned, a decoding algorithm translates the 65 bars into the array of 31 digits. Thus, the intelligent barcode 10 can offer a data payload of 31 digits, whereas the barcodes 20, 30 typically offer data payloads of 11 to 13 digits. Combining the barcodes 20, 30 on a mail piece typically offers a maximum of 26 digits of data.

The intelligent barcode's increased number of digits can allow more digits to be assigned to mailers for their own individual use, such as but not limited to their own unique coding purposes. In one embodiment, the mailing service 420 offers mailers 410 up to 9 digits in a Destination Confirm intelligent barcode 10 and up to 15 digits in an Origin Confirm intelligent barcode 10 for their own use to track mail pieces. Thus, the expanded data capacity of the intelligent barcode 10 can allow for a greater number of uniquely identifiable mail pieces. In another embodiment, the expanded tracking capability of the intelligent barcode 10 allows mailers greater visibility into the mail stream.

The expanded data capacity of the intelligent barcode 10 can also allow a mailing service to use intelligent barcodes for more applications, beyond mail sorting and tracking services currently available through the use of prior art barcodes 20, 30. For example, in one embodiment, the intelligent barcode 10 contains information allowing the mail service 420 to provide address change services to the mailer 410, in addition to information for sorting and tracking purposes. Such address change services are described in greater detail below. In another embodiment, the intelligent barcode 10 contains information allowing the mailing service 420 to identify a mail piece as undeliverable-as-addressed (UAA) and dispose of the mail piece, forward the mail piece to the correct address, or return the mail piece to the sender, such as the mailer 410. In yet another embodiment, the intelligent barcode 10 allows mailers 410 more visibility into the mail stream and information on the quality of their mailings. Thus, the intelligent barcode 10 can be encoded such that multiple services may be supported by a single barcode. In one embodiment, the intelligent barcode 10 can also relate multiple services to a single mail piece and a single mailer 410.

Figure 6:
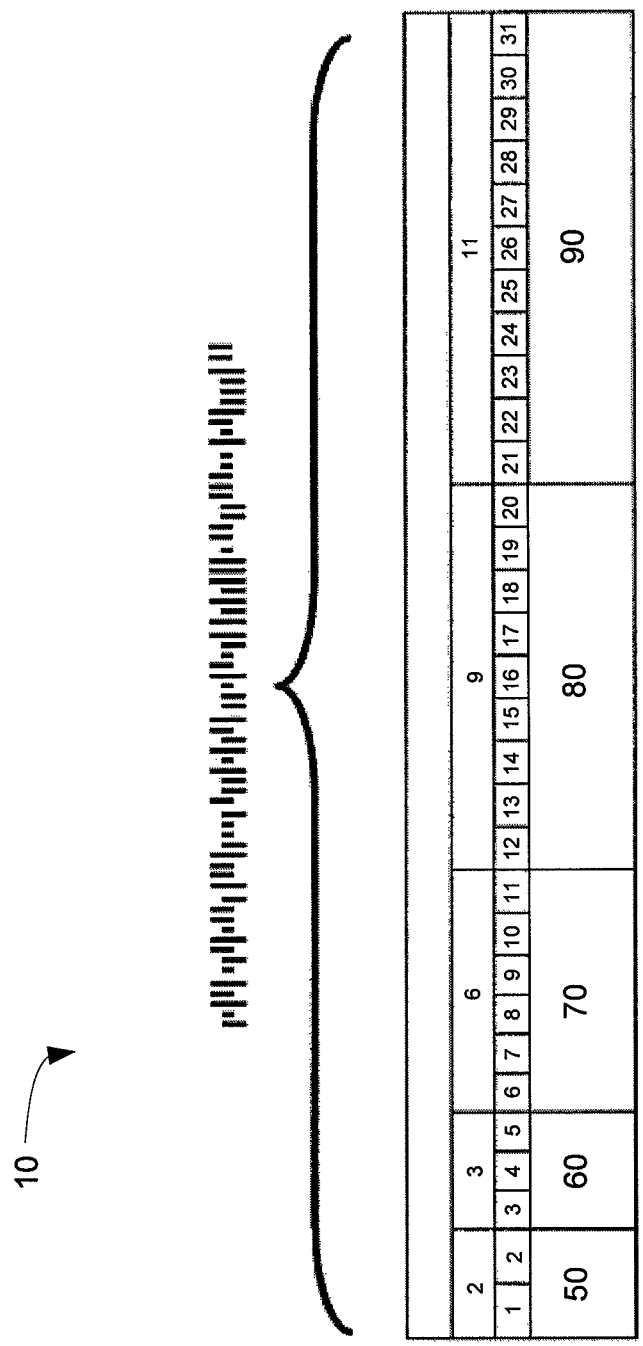
FIG. 6 illustrates a destination confirm intelligent barcode according to one embodiment.

The types of data that can be represented in the intelligent barcode 10 will now be described in further detail. FIG. 6 illustrates a destination confirm intelligent barcode 10 according to embodiments of the development. The intelligent barcode 10 can be divided into multiple fields, such as but not limited to fields 50, 60, 70, 80, and 90. In the embodiment illustrated in FIG. 6, the field 90 contains 11 digits which represent routing or destination data that can be used to sort and route a mail piece. In other embodiments, field 90 contains 0, 5, 9, or 9 digits. For example, the field 90 can accommodate 0, 5, 9, or 11 digits of ZIP™ Code information, also known as a delivery point ZIP™ Code, associated with a mail recipient 470, or addressee.

A field 80 may contain 9 digits representing a mailing identification (ID), or serial number. In some embodiments, the field 80 is available to the mailer 410 to use for its own identification purposes and is thus considered "open" by the mailing service 420. The digits can uniquely identify, for example, a particular mail piece, a particular mailing, or a particular client.

A field 70 may contain a six-digit code which, in some embodiments, is not considered "open" by the mailing service 420. The field 70 may include, for example, a mailer identification (ID), also known as a subscriber ID. This Mailer ID/Subscriber ID can be assigned to the mailer 410 by the mailing service 420 to identify a particular mailer or a particular subscriber to a service offered by the mailing service 420. In some embodiments, mailers 410 who were assigned a five-digit Subscriber ID to use in barcodes 20, as discussed above, can add a leading zero to their Subscriber ID to represent a six-digit Subscriber ID for use in the intelligent barcode 10.

In one embodiment, the mailer ID is a six-digit number that uniquely identifies the mailer 410. According to one example, if the mailer ID is a six-digit number, the mailing ID is limited to nine digits. Thus, according to one example, there are 1 billion unique nine-digit mailing IDs available for mailers 410 using a six-digit mailer ID. In another embodiment, the mailer ID is a nine-digit number that uniquely identifies the mailer 410. According to one example, if the mailer ID is a nine-digit number, the mailing ID is limited to six digits. Thus, according to one example, there are 1 million unique six-digit mailing IDs available for mailers 410 using a nine-digit mailer ID.

According to one aspect of the present development, the mailing service 420 assigns the mailer 410 a mailer ID based on the volume of mail the mailer 410 transmits annually to the mailing service 420. In one embodiment, a mailer 410 who mails 10 million or more mail pieces annually will be assigned a six-digit mailer ID. The mailer 410 can request additional six-digit mailer IDs to satisfy additional mailing needs. In another embodiment, a mailer who mails less than 10 million mail pieces annually will be assigned a nine-digit mailer ID. The mailer 410 can request additional nine-digit mailer IDs to satisfy additional mailing needs. In yet another embodiment, six-digit mailing IDs assigned by the mailing service 420 begin with numbers "0" through "8," and nine-digit mailing IDs assigned by the mailing service begin with the number "9."

A field 60 may contain a 3-digit code identifying the specific service the mailer 410 has selected for the mail piece. For example, the field 60 may contain a service type identification (ID) that identifies the mailer 410 requests destination confirm service for the mail piece, or alternatively, origin confirm service for the mail piece. The Service Type ID can also identify the mail class of the mail piece, such as but not limited to First-Class, Standard, and Periodicals mail. The mail class can indicate, among other things, what class of service or treatment the mail piece should be given, based on the mailer 410's indication of a particular mail class. Table 1 illustrates possible classes of service for a mail piece according to one embodiment.

TABLE 1

| Service Type ID | Class/Shape of Mail |
|---|---|
| 040 | First-Class Mail letters |
| 041 | First-Class Mail flats |
| 042 | Standard Mail letters |

TABLE 1-continued

| Service Type ID | Class/Shape of Mail |
|---|---|
| 043 | Standard Mail flats |
| 044 | Periodicals letters |
| 045 | Periodicals flats |
| 046 | First-Class Mail cards |
| 047 | Standard Mail cards |

Thus, for example, a Service Type ID of "040" in the field 60 can represent the mailer 410's selection of Destination Confirm First Class treatment for a letter mail piece. Similarly, a Service Type ID of "042" can represent the mailer 410's selection of Destination Confirm Standard Mail treatment for a flat mail piece. In one embodiment, all mail pieces requesting origin confirm service have "050" in the field 60, regardless of the mail class of the mail piece.

In one embodiment, the mailer 410 identifies a mail class for a mail piece using a specific Service Type ID, and thereby requests special services for the mail piece such as tracking or address correction services. Special services can include tracking and address correction services for mailers 410 who use the intelligent barcode 10, such as for example, OneCode Confirm™ and OneCode ACS™. According to one embodiment, OneCode Confirm™ is a tracking service, such as a destination and/or origin confirm service, offered to the mailer 410 who requests such tracking and/or confirm services in the Service Type ID of the intelligent barcode 10 applied to its mail pieces. According to another embodiment, OneCode ACS™ is an address correction service, such as that described in greater detail below with reference to FIGS. 10 and 12-14, offered to the mailer 410 who requests such address correction services in the Service Type ID of the intelligent barcode 10 applied to its mail pieces.

In another embodiment where the mailer 410 does not identify a mail class for the mail piece or request special services, the Service Type ID can be used by the mailing service 420 to apply automation rate discounts. Thus, the mailer 410 who does not request special services may still receive an automation rate discount in accordance with the Service Type ID in the intelligent barcode 10 applied to a mail piece.

A filed 50 may contain a 2-digit code for internal use by the mailing service 420. In one embodiment, mailers 410 may populate the filed 50 with two zeroes. In some embodiments, the filed 50 is reserved for indicating an optional endorsement line sort level and exception handling. For example, in one embodiment, optional endorsement line and exception handling information encoded in the intelligent barcode 10 provide instructions to the mailing service 420 on disposition of a mail piece. In another embodiment, the mailing service 420 treats a mail piece in accordance with optional endorsement line and exception handling instructions for a fee.

In one embodiment, the mailer 410 "seeds" outgoing mailings with a destination confirm intelligent barcode 10 attached to some mail pieces, but not every mail piece. The mailer 410 can use data from the seeded mail pieces to make assumptions about the entire mailing. For example, in one embodiment, the mailer 410 seeds every tray of a mailing with five destination confirm intelligent barcodes 10 attached to five mail pieces. The mailer 410 can receive information from the mailing service 420 about the seeded mail pieces to make assumptions about the entire tray. The mailer 410 can choose the seed quantity and coverage to meet its specific needs.

In another embodiment, the mailer 410 seeds outgoing mailings by placing destination confirm intelligent barcodes 10 on Confirm Smart Seed mail pieces in the mailing. In one embodiment, Confirm Smart Seed is a service offered by the mailing service 420 that allows the mailer 410 to receive mail processing equipment scan data for the mailing without applying the intelligent barcode 10 to mail pieces that will be delivered to customers. Thus, in one embodiment, the mailer 410 obtains the benefit of seeding using intelligent barcode technology without attaching the intelligent barcode 10 to its mail pieces. Further embodiments and details of destination confirm services offered by the mailing service 420 according to one embodiment are described in U.S. POSTAL SERVICE, CONFIRM SERVICE FEATURING ONE CODE CONFIRM: PUBLICATION 197 (2008), which is hereby incorporated herein by reference.

In some embodiments, the combination of Mailing ID digits in the field 80 and the Subscriber ID digits in the field 70 make the intelligent barcode 10 unique to the particular mail piece to which it is affixed. Thus, the combination of Mailing ID and Subscriber ID in the intelligent barcode 10 may be a unique mail piece identifier. In some aspects, it is desirable to maintain mail piece uniqueness for a specific period of time. Maintaining mail piece uniqueness can assist the mailing service 420 to sort and track mail pieces, for example. In one embodiment, the mailing service 420 instructs the mailer 410 to maintain mail piece uniqueness for a specific period of time, including but not limited to 10, 25, 30, 45, 50, or 60 days. In another embodiment, the specific period of time during which mail piece uniqueness must be maintained is 45 calendar days.

In another embodiment, the mailer 410 uses the intelligent barcode 10 bearing Mailing ID "X" and Subscriber ID "Y" on a first mail piece. The mailing service 420 instructs the mailer 410 not to reuse this same intelligent barcode 10 bearing Mailing ID "X" and Subscriber ID "Y" on a second mail piece within 45 calendar days of the date the first mail piece was inducted into the mailing system 400. In yet another embodiment, the mailer 410 may not use the intelligent barcode 10 bearing Mailing ID "X" and Subscriber ID "Y" on two pieces of mail in the same mail category within 45 calendar days, but may use the same intelligent barcode 10 bearing Mailing ID "X" and Subscriber ID "Y" on two mail pieces in different mail categories within 45 calendar days. Thus, in this embodiment, mail piece uniqueness is not maintained across mail classes, and two mail pieces can carry the same Mailing ID and Subscriber ID combination within the same 45-day uniqueness period as long as they are in different mail classes.

Persons of skill in the art will understand that multiple fields in the intelligent barcode 10 can be used to maintain mail piece uniqueness, not just the Mailing ID and Mailer/Subscriber ID. Thus, in one embodiment, the combination of Service Type ID, Mailer/Subscriber ID, and Mailing ID is used to maintain mail piece uniqueness across mail classes, but not within the same mail class. For example, in one embodiment the same Mailing ID and Subscriber ID is used on two mail pieces in different classes of mail, and the mail pieces bear different Service Type IDs in the intelligent barcode 10. In this example, the Service Type ID, and particularly the combination of Service Type ID, Mailer/Subscriber ID, and Mailing ID, is used to uniquely identify the mail pieces.

Because maintaining mail piece uniqueness can improve the mailing service's sorting and tracking services and systems, the mailing service 420 may incentivize mailers 410 to use unique, intelligent barcodes 10 on their mailings. Such incentives may be called "automation discounts." In one embodiment, the mailing service 420 offers reduced postal rates to mailers 410 who apply the intelligent barcodes 10 to their mailings. Other incentives, such as but not limited to the provision of advanced tracking information to the mailer 410, the provision of address correction information at no or reduced cost, and forwarding of undeliverable-as-addressed (UAA) mail at no or reduced cost, will be described in greater detail below.

In one embodiment, the mailer 410 applies unique, intelligent barcodes 10 to individual mail pieces. In another embodiment, the mailer 410 also applies unique, intelligent barcodes to each handling unit used to transport individual mail pieces to the mailing service 420. Handling units can include, for example, trays, tubs, sacks, or bundles. The intelligent barcode 10 that is applied to a handling unit may take the same or similar form to that described above with respect to the intelligent barcode 10 for mail pieces, or it may take another form. In some cases, the mailer 410 has a large number of handling units and uses containers to transport the handling units to the mailing service 420. In yet another embodiment, the mailer 410 also applies unique, intelligent barcodes to mail pieces, handling units, and the containers used to transport handling units to the mailing service 420. Containers can include, for example, pallets, gaylords, and All Purpose Containers (APCs).

In some aspects described in greater detail below, the mailer 410 generates and transmits postage statements to the mailing service 420 using an approved electronic method. These postage statements can be transmitted before or at the same time the mail pieces are transmitted to the mailing service 420. In other aspects, the mailer 410 generates and transmits mailing documentation to the mailing service 420 using an approved electronic method. This mailing documentation can be transmitted before or at the same time the mail pieces are transmitted to the mailing service 420. In one embodiment, the mailing documentation describes how individual mail pieces are linked to handling units, and how handling units are linked to containers, when containers are used.

In another embodiment, the mailer 410 may use the intelligent barcode 10 on its mail pieces, handling units, and containers (if any), but the mailing service 420 will not offer incentives to the mailer 410 unless the mailer 410 also transmits postage statements and/or mailing documentation to the mailing service 420 describing how the mail pieces, handling units, and containers are linked. In yet another embodiment, the mailing service 420 offers a "basic service" for a limited period of time, during which the mailer 410 can use the intelligent barcodes 10 on its mail pieces without maintaining barcode uniqueness and without the provision of postage statements and/or mailing documentation to the mailing service 420. During this period of time, the mailer 410 can transition to new systems allowing it to maintain barcode uniqueness and can become familiar with the preparation of postage statements and mailing documentation. The mailing service 420 may offer this simplified use of the intelligent barcodes 10 for a limited period of time to incentivize the mailer 410 to obtain and become familiar with systems that will allow it to maintain intelligent barcode uniqueness for a specific period of time, such as but not limited to 45 days, and to obtain and become familiar with the preparation and transmission of postage statements and mailing documentation using the intelligent barcodes 10.

At the expiration of the limited period of time, the mailing service 420 may require all mailers 410 to comply with all or a subset of "full service" requirements in order to qualify for incentives such as reduced postage rates and the provision of additional postal services. Such full service requirements can include but are not limited to: (1) applying the intelligent barcodes 10 to mail pieces, handling units, and containers; (2)

maintaining barcode uniqueness for a specific period of time; (3) transmitting postage statements for each mailing to the mailing service using approved electronic methods; and (4) transmitting mailing documentation for each mailing to the mailing service using approved electronic methods. In one embodiment, mailers 410 who satisfy full service requirements receive additional tracking and address correction services for their intelligent barcode-marked mail pieces free of charge. Start-the-clock tracking services and address correction services according to one embodiment are described in greater detail below with reference to FIGS. 10-14.

Persons of skill in the art will understand full service requirements are not limited to those just described, but can include any requirement that assists the mailing service 420 in the provision of acceptance, sorting, tracking, address correction, forwarding, and delivery services. For example, in one embodiment, the mailer 410 must comply with some or all of the full service requirements outlined above, as well as use a delivery point code in the field 90 of the intelligent barcode 10 in order to qualify for incentives and benefits of the full service system.

In one embodiment, the mailer 410 must comply with all four full service requirements in order to qualify for advantageous postage rates and/or additional postal services. In another embodiment, the mailing service 420 does not require the mailer 410 to comply with all full service requirements for all mailings in order to qualify for reduced postage rates or other incentives. In one embodiment, for example, the mailer 410 need not comply with all full service requirements if its mailing contains less than 10,000 mail pieces and correct postage is affixed to each piece. In this example, a unique intelligent barcode 10 is not required on every mail piece for the mailing to qualify for full service incentives. In another example, a unique intelligent code 10 is required on every mail piece for the mailing to qualify for incentives, but the mailer 410 need not maintain barcode uniqueness for a specific period of time, transmit postage statements to the mailing service 420, or transmit mailing documentation to the mailing service 420.

In another embodiment, the mailer 410 need not comply with all full service requirements if its mailing contains less than 10,000 mail pieces, each mail piece is of identical weight, and mail pieces are separated by price. Persons of skill in the art will understand that the specific standards by which a mailing that does not meet all full service requirements but nonetheless qualifies for full service benefits are not limited to those just described. Any combination of factors may be used to allow a mailing to qualify for full service treatment and incentives, such as but not limited to the size of the mailing, the degree of sorting present in the mailing, the degree to which correct postage is affixed to mail pieces in the mailing, and the degree to which mail pieces in the mailing are similar in weight, size, or postage rate.

Persons of skill in the art will also understand that the development is not limited to the "basic" and "full" service systems described above. Any combination of requirements can be used to develop, for example, basic, mid-level, and full service requirements. In one embodiment, requirements are cumulative as a mailer progresses to the next highest level, such that the mailer 410 must meet all basic level requirements in addition to mid-level requirements to qualify for mid-level service. Further embodiments and details of services offered by the mailing service 420 according to one embodiment are described in Implementation of New Standards for Intelligent Mail Barcodes, 73 Fed. Reg. 49,333 (Aug. 21, 2008), which is hereby incorporated herein by reference.

Figure 7:
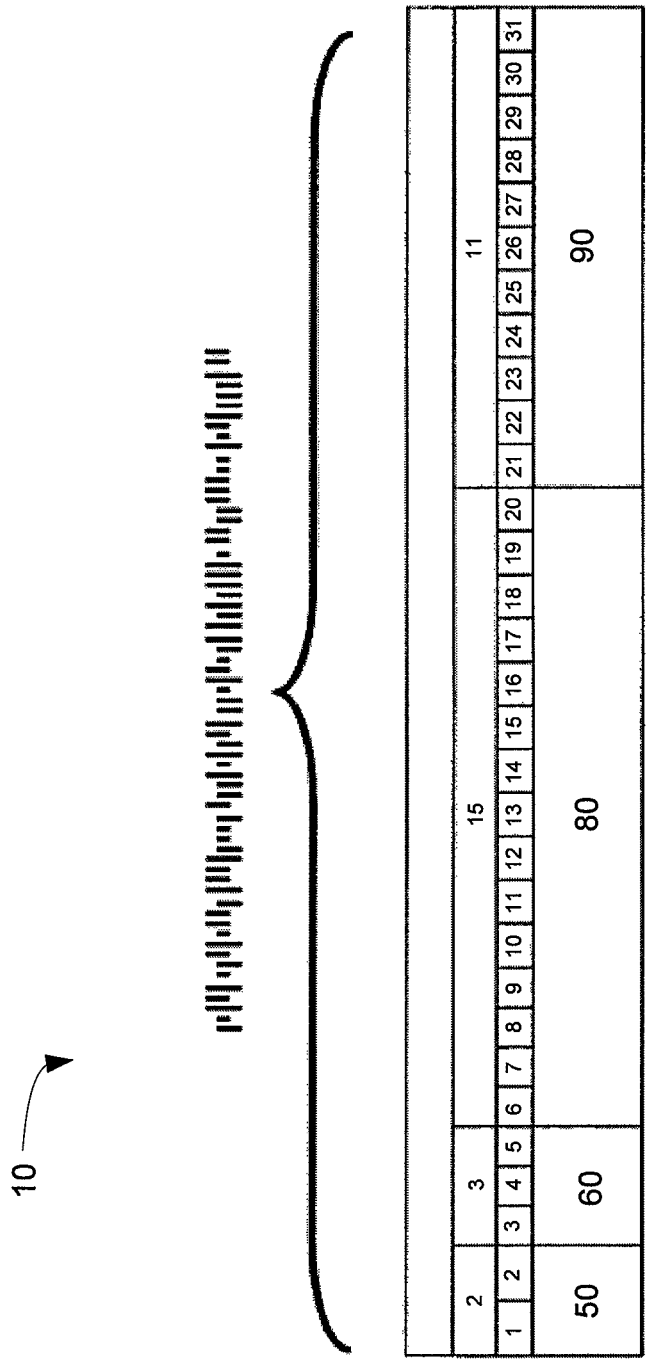
FIG. 7 illustrates an origin confirm intelligent barcode according to one embodiment.

Persons of skill in the art will understand that the intelligent barcode 10 need not be unique to qualify for full service benefits. For example, FIG. 7 illustrates an origin confirm intelligent barcode 10 according to embodiments of the development. As explained in greater detail above, origin confirm service can be used to notify the mailer 410 that a piece of reply mail has entered the mail stream and is enroute to the mailer 410. Origin confirm intelligent barcode 10 can be preprinted, for example, on a piece of reply mail sent to a customer or the mail recipient 470. When the mail recipient 470 places the reply mail in the mail stream, the mailing service 420 identifies it as a mail piece bearing an origin confirm intelligent barcode 10 and should therefore receive origin confirm services. Such services include but are not limited to notifying the mailer 410 that a mail piece bearing origin confirm intelligent barcode 10 has entered the mail stream and is enroute to the mailer 410.

The origin confirm intelligent barcode 10 can be divided into multiple fields, such as but not limited to fields 50, 60, 80, and 90. In the embodiment illustrated in FIG. 7, a field 90 contains 11 digits which represent routing or destination data that can be used to sort and route a mail piece. In other embodiments, the field 90 contains 0, 5, or 9 digits. For example, the field 90 can accommodate 0, 5, 9, or 11 digits of ZIP™ Code information, also known as a delivery point ZIP™ Code, for the mail recipient 470, or addressee.

A field 80 may contain 15 digits representing a customer identification (ID). In some embodiments, the field 80 is available to the mailer 410 to use for its own identification purposes and is thus considered "open" by the mailing service 420. The digits can uniquely identify, for example, a particular reply mail piece or a particular customer who mails the reply mail piece back to the mailer 410.

A field 60 may contain a 3-digit code identifying the specific service the mailer 410 has selected for the mail piece. For example, the field 60 may contain a service type identification (ID) that identifies that the mailer 410 requests destination confirm service for the mail piece, or alternatively, origin confirm service for the mail piece. In one embodiment, all mail pieces requesting origin confirm service have "050" in the field 60, regardless of the mail class of the mail piece.

A filed 50 may contain a 2-digit code for internal use by the mailing service 420. For example, mailers 410 may populate this field. In some embodiments, the filed 50 is reserved for indicating an optional endorsement line sort level and exception handling. For example, in one embodiment, optional endorsement line and exception handling information encoded in the intelligent barcode 10 provide instructions to the mailing service 420 on disposition of a mail piece. In another embodiment, the mailing service 420 treats a mail piece in accordance with optional endorsement line and exception handling instructions for a fee.

As demonstrated in the embodiment illustrated in FIG. 7, the origin confirm intelligent barcode 10 may not contain a field 70, or a 6-digit Subscriber ID in the field 70. In such an embodiment, there may be no unique Subscriber ID to combine with the Customer ID in the field 80. Thus, in some embodiments, the origin confirm intelligent barcode 10 is not a unique mail piece identifier, because multiple reply mail pieces may be marked with, for example, the intelligent barcode 10 illustrated in FIG. 7.

In some embodiments, the mailing service 420 instructs mailers 410 using origin confirm services to use a 9- or 11-digit routing ZIP™ Code in the field 90. The mailing service may also instruct origin confirm mailers 410 that the 9- or 11-digit routing ZIP™ Code in the field 90 also serves as a Subscriber ID for the origin confirm mailing. The origin confirm mailer 410 may register up to, for example, 200 separate 9- or 11-digit ZIP™ Codes to which Origin Confirm reply mail pieces will be mailed. The origin confirm mailer 410 can identify, or register for, these ZIP™ Codes by transmitting the codes to the mailing service 420 and having the codes stored in an account associated with the mailer 410.

In some embodiments, an origin confirm mail piece bearing the intelligent barcode 10 such as that illustrated in FIG. 7 will be mailed to the mailing service 420 by a mail recipient 470 and identified as an origin confirm mail piece by automated processing equipment located at the mailing service 420. The Service Type ID in the field 60 may notify the mailing service 420 that the mail piece is an origin confirm reply mail piece. The mailing service 420 may then identify the 9- or 11-digit ZIP™ Code as a code for which the mailer 410 has registered, and notify the mailer 410 that a reply mail piece bearing the intelligent barcode 10 is in the mail stream and enroute to the mailer 410.

In addition to using the intelligent mail barcode 10 to request and receive destination confirm and origin confirm services from the mailing service 420, the mailer 410 can request to receive address corrections for any undeliverable-as-addressed (UAA) mail pieces using the intelligent mail barcode 10. In addition, the mailer 410 can also instruct the mailing service 420 on how it wants any UAA mail pieces to be handled. For example, the mailer 410 can indicate its desire to have any UAA mail pieces forwarded, returned-to-sender, or treated as waste and disposed.

Different mail classes have different "default" treatments of UAA mail. Within the First-Class Mail class, for example, the "default" treatment for a mail piece that cannot be delivered is for the mail piece to be either forwarded or returned to the mailer 410 ("return to sender"). In the Periodicals class, the "default" treatment of UAA mail is to forward mail pieces for the first 60 calendar days following an addressee's move date and dispose of all other UAA mail pieces as waste. For Standard Mail and Bound Printed Matter, the "default" treatment of UAA mail is to dispose of the mail piece as waste.

The mailer 410 can instruct the mailing service 420 to handle any UAA mail pieces in a manner different than the default treatment provided for the class of mail. For example, First-Class Mail mailers 410 can tell the mailing service 420 to dispose of undeliverable-as-addressed mail pieces rather than forwarding or returning the mail pieces. Standard Mail mailers 410 can indicate their desire to have any undeliverable mail that can be forwarded sent to the addressee's new address and all other mail disposed as waste.

In one embodiment, the mailer 410 instructs the mailing service 420 of its intent to have its UAA mail treated in a manner different than the default treatment by providing an ancillary service endorsement that describes how to handle any UAA mail pieces. In some embodiments, the mailer 410 prints the ancillary service endorsement on a mail piece and the mailing service 420 recognizes the ancillary service endorsement when it processes UAA mail. Table 2 provides ancillary service endorsements used in one embodiment of the development.

TABLE 2

Address Service Requested (ASR)
Change Service Requested (CSR)
Forwarding Service Requested (FSR)
Return Service Requested (RSR)
Temp-Return Service Requested (TRSR)
Electronic Service Requested (ESR)

In one embodiment, the mailing service 420 only allows certain ancillary service endorsements to be used with certain classes of mail. For example, in one embodiment, the Temp-Return Service Requested (TRSR) ancillary service endorsement can only be used on First-Class Mail mail pieces. In another embodiment, the Electronic Service Requested (ESR) ancillary service endorsement can only be used on mail pieces requesting specific address correction services. Such services include, but are not limited to, the ACS and the OneCode ACS® services provided by the United States Postal Service.

In another embodiment, the mailer 410 uses an ancillary service endorsement on a mail piece to request additional services in conjunction with the handling of its UAA mail than is typically provided by the mailing service 420. In still another embodiment, the presence of an ancillary service endorsement on the mail piece is the mailer's acknowledgement that it agrees to pay to receive these extra services, if an additional charge applies. For example, if the mailer 410 uses the Address Service Requested endorsement on a Standard Mail mail piece, the mailing service 420 will provide a service to the Standard Mail mail piece. In one embodiment, the mailing service 420 provides forwarding services if a change-of-address is on file. In another embodiment where no change-of-address is on file, the mailing service 420 returns the undeliverable mail piece to the mailer 410 for a fee, which is charged to the mailer 410. In one aspect of the development, the fee is based on the weight of the mail piece. Since forwarding is not provided as part of Standard Mail processing offered by the mailing service 420 in this embodiment, the mailer 410 must pay an additional fee to have mail pieces forwarded and/or returned.

In yet another embodiment, the mailer 410 uses ancillary service endorsements in conjunction with an address correction service provided by the mailing service 420. Such services include, but are not limited to, the ACS and the OneCode ACS® services provided by the United States Postal Service. In some embodiments, the mailer 410 subscribes to the address correction service and uses prior art barcodes 20, 30 on its mail pieces to receive address correction notices as part of its subscription. Such services include, but are not limited to, the ACS service provided by the United States Postal Service. In other embodiments, the mailer 410 subscribes to the address correction service and uses the intelligent barcode 10 on its mail pieces to receive address correction notices as part of its subscription. Such services include, but are not limited to, the OneCode ACS® service provided by the United States Postal Service.

In one embodiment, the mailer 410 changes the default treatment that will be applied to its mail piece by choosing a Service Type ID and an ancillary service endorsement that together describe how to handle the mail piece. In another embodiment, the mailer 410 uses a particular ancillary service endorsement and a particular Service Type ID in the intelligent barcode 10 to indicate to the mailing service 420 which additional services the mailer 410 requests for the mail piece. The Service Type ID can be indicated, for example, in field 60 of the intelligent barcode 10 as illustrated in FIGS. 6 and 7. Further embodiments, details, and combinations of ancillary service endorsements and Service Type IDs, and the resulting treatment applied to the mail piece by the mailing service 420, are described in Appendix A of the publication U.S. POSTAL SERVICE, A GUIDE TO INTELLIGENT MAIL FOR LETTERS AND FLATS (2008), which is hereby incorporated herein by reference.

According to one embodiment, a mailer 410 that has subscribed to the address correction service and uses an ancillary service endorsement on its mail piece receives an electronic notification from the mailing service 420. The electronic notification can indicate, for example, that a mail piece was UAA. In one embodiment, the electronic notification also provides the addressee's new address or the reason why the mail piece could not be delivered. In another embodiment, the only ancillary service endorsements that can be used in conjunction with the address correction service are Address Service Requested and Change Service Requested.

In some embodiments, the mailer 410 has not subscribed to the address correction service provided by the mailing service 420, but still uses an ancillary service endorsement on its mail pieces. In such embodiments, the mailing service 420 notifies the mailer that a mail piece was UAA by sending the mailer 410 a hard copy notice or by returning the mail piece to the mailer 410. The hard copy notice may provide a photocopy of the UAA mail piece with either the addressee's new address or the reason why the mail piece could not be delivered.

In one embodiment of the present development, the mailing service 420 provides tracking and address correction services free of charge to mail pieces that satisfy full service requirements. In another embodiment, the mailing service 420 changes the default service applied to a full service mail piece free of charge when the change in service or treatment is requested in an ancillary service endorsement and/or Service Type ID in the intelligent barcode 10. In yet another embodiment, the mailing service 420 provides start-the-clock service, described in greater detail below with reference to FIG. 11, free of charge to full service mail piece regardless of the Service Type ID identified in the intelligent barcode 10. In still another embodiment, the mailing service 420 offers tracking, start-the-clock, and address correction services to mail pieces that satisfy basic service requirements for an additional fee.

A Mail Processing System

Mail processing systems and methods using the intelligent barcode 10 will now be described in greater detail. Mail processing systems and methods as described herein may be performed by the mailer 410, the mailing service 420, and/or the mail recipient 470, as described above with reference to FIG. 4.

Figure 8:
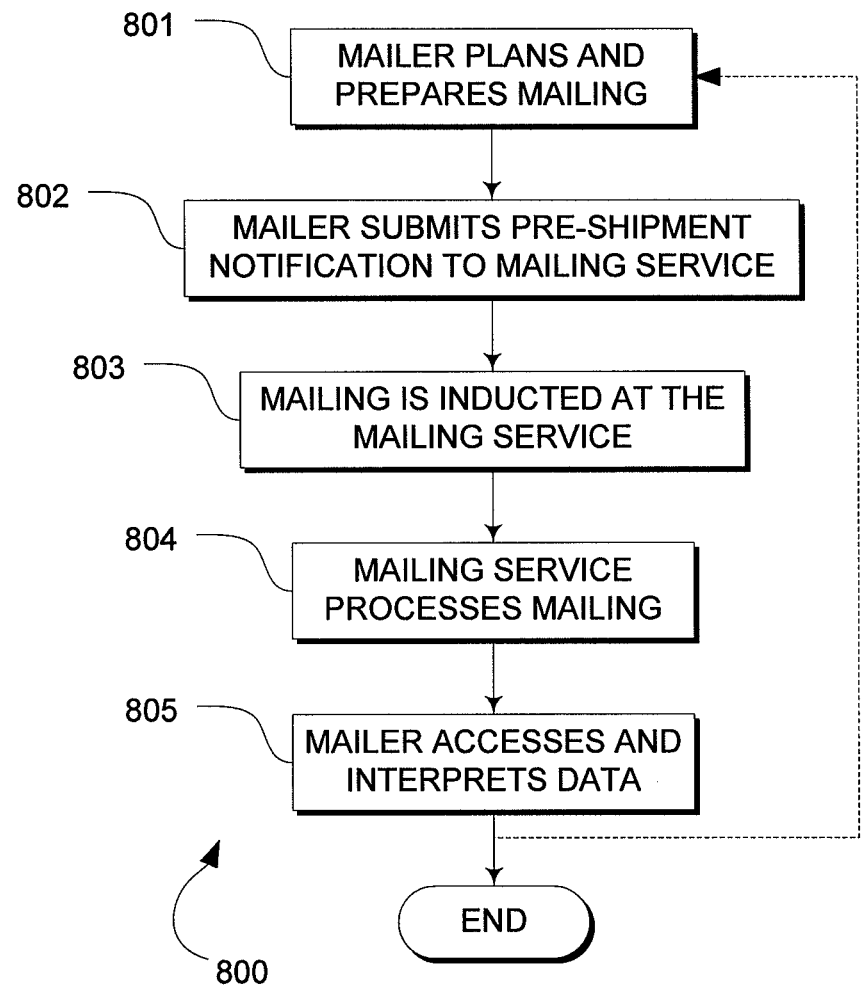
FIG. 8 is a flowchart illustrating one embodiment of a method of planning, transmitting, and processing mail using an intelligent barcode such as that illustrated in FIG. 1.

FIG. 8 is a flowchart illustrating one embodiment of a method 800 for processing mail using the intelligent barcode 10. The method 800 begins at block 801 in which the mailer 410 plans and prepares a mailing. The mailer 410 may be the owner of the mailing, or alternatively, it may be a mail preparer whom the owner of the mail has designated to prepare and transmit the mailing. The mailer 410 is not limited to mail preparers and mail owners, however, and can include a computerized or electronic system for sending mail. Systems for sending mail can also include, for example, presort mailers who perform automated processing of mail pieces from multiple mail owners or customers. These systems can receive mail in batches from different customers, combine and sort the batches to obtain postage discounts, then transmit the combined mailing to the mailing service 420.

Moving to a block 802, the mailer 410 submits a preshipment notification to the mailing service 420. The notification informs the mailing service 420 that the mailer 410 plans to induct a mailing into the mail stream, and provides information on the mailing to the mailing service 420. In one embodiment, the mailing service 420 sends a confirmation to the mailer 410 confirming receipt of the pre-shipment notification. In another embodiment, the mailing service 420 analyzes the pre-shipment notification and sends back an estimate of postage to the mailer 410. In still another embodiment, scheduling information is exchanged electronically between the mailer 410 and the mailing service 420. Next at block 803, the mailing is transported to the mailing service 420 and inducted into the mail stream.

Moving next to block 804, the mailing service 420 processes the mailing. In one embodiment, mail processing includes sorting the mail pieces, then delivering them to their intended destination, such as the mail recipients 470. In another embodiment, mail processing includes tracking the mail pieces as they move to their intended destination. In yet another embodiment, mail processing includes identifying that a mail piece is undeliverable-as-addressed (UAA), and notifying the mailer 410 that the mail piece is UAA. In still another embodiment, mail processing includes providing address correction services to the mailer 410 for the UAA mail piece. In yet still another embodiment, mail processing includes forwarding the piece of address-corrected mail to its intended destination, such as the mail recipient 470.

Next at block 805, the mailer 410 accesses and interprets data resulting from the mail processing at block 804. In one embodiment, data access and interpretation includes accessing and interpreting tracking records indicating the location of one or more mail pieces in the mail stream. In another embodiment, data access and interpretation includes accessing and interpreting records and/or notices that a mail piece was undeliverable-as-addressed. In yet another embodiment, the mailer 410 accesses and interprets address correction notices and/or records. In still another embodiment, the mailer 410 incorporates the address correction notices into its address records for future mailings. In yet still another embodiment, the mailer 410 accesses and interprets information that a piece of address-corrected mail has been forwarded to its intended destination.

As noted above with regard to address correction notices, the mailer 410 can access various pieces of data on its mailing, including but not limited to the quality of its mail preparation, the accuracy of its address records, and the actual time and cost for delivery compared to anticipated time and cost. Thus, in one embodiment, the method 800 does not end and progresses from block 805 back to block 801. In this embodiment, the mailer 410 uses data gleaned from a first mailing at block 805 to improve the planning and preparation for a subsequent mailing at block 801.

Figure 9:
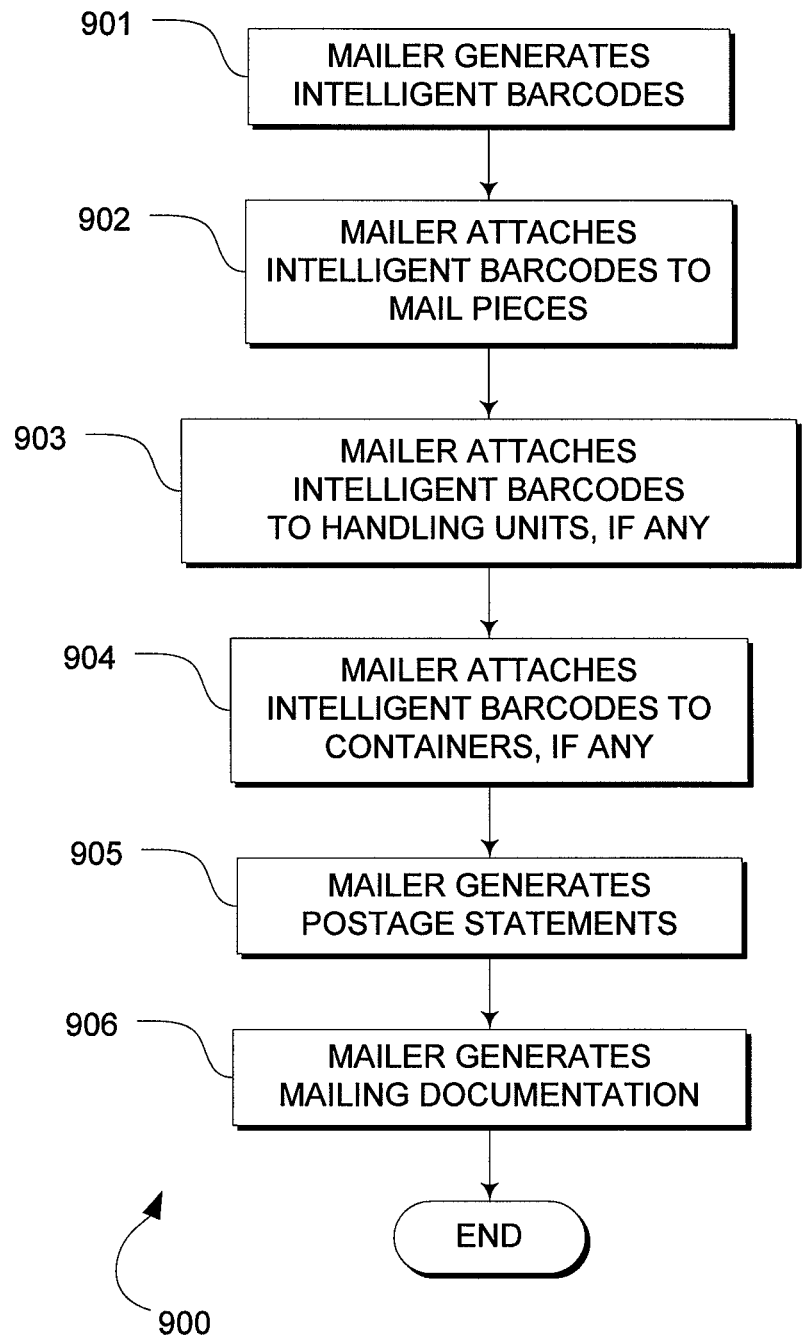
FIG. 9 is a flowchart illustrating one embodiment of a method of preparing a mailing using an intelligent barcode such as that illustrated in FIG. 1.

FIG. 9 is a flowchart illustrating in greater detail the mail preparation and planning step at block 801 in FIG. 8. One embodiment of a method 900 for planning and preparing a mailing using the intelligent barcode 10 is illustrated. The method 900 begins at block 901 in which a mailer 410 generates intelligent barcodes 10 for an anticipated mailing. Any suitable encoder tool may be used to encode the numeric representation of a mailer's tracking and delivery point ZIP™ Code information into the graphic representation of the intelligent barcode 10. In one embodiment, the mailing service 420 provides an online encoder tool that allows the mailers 410 to encode numeric values into the intelligent barcodes 10, as well as an online decoder tool allowing the mailers 410 to enter an intelligent barcode sequence and receive the numeric representation of that barcode.

In another embodiment, the mailing service 20 offers more advanced services to encode the intelligent mail barcode 10 in a production environment. The mailing service 420 can offer an extended library of encoder source and binary code that a mailer 410 can download and install on a range of platforms. Table 3 lists operating systems and language and application environments the mailing service 420 supports according to one embodiment of the development, where "Y" indicates a combination is supported and "N" indicates a combination is not supported.

TABLE 3

| Operating System | Language and Applications Supported | | | | | |
| --- | --- | --- | --- | --- | --- | --- |
| | C | Java 2 | COBOL | PL/1 | MS Access | MS Excel |
| MVS, z/OS, and OS/390 | Y | Y | Y | Y | N | N |
| VSE/ESA | Y | N | Y | Y | N | N |
| OS/400 | Y | Y | Y | N | N | N |
| AIX | Y | Y | N | N | N | N |
| Linux for pSeries | Y | Y | N | N | N | N |
| Linux for intel[2] | Y | Y | N | N | N | N |
| Programmer Version for Windows | Y | Y | N | N | N | N |
| MS Office Version for Windows | N | N | N | N | Y | Y |

In one embodiment, the encoding software package for each operating system can be distributed as a standard zip file. In another embodiment for printing the intelligent barcode 10 in a production environment, a variety of intelligent barcode fonts are available for five major production printing environments: AFP (MVS, AS/400, VM, and VSE); HP PCL; PostScript; XeroX™ Metacode, and TrueType.

Moving to block 902, the mailer 410 affixes the intelligent barcodes 10 to the mail pieces. Next at block 903, the mailer 410 attaches the intelligent barcodes 10 to handling units, if any, used to transport individual mail pieces to the mailing service 420. Handling units can include, for example, trays, tubs, sacks, or bundles. Moving next to block 904, the mailer 410 next attaches the intelligent barcodes 10 to containers, if any, used to transport handling units to the mailing service 420. Containers can include, for example, pallets, gaylords, and All Purpose Containers (APCs).

At block 905, the mailer 410 generates postage statements using an electronic method approved by the mailing service 420. This can ensure the postage statements are compatible with and readable by the mailing service's electronic systems. In one embodiment, postage statements provide information on the postage applied to each mail piece. In another embodiment, postage statements provide information such as, but not limited to, the mail class of one or more mail pieces, the weight per item in the mailing, the number of items in the mailing, the mail shape of one or more mail pieces, how mail pieces are sorted, the base rate, discounts claimed by the mailer 410, and the mail deposit location. Moving to block 906, the mailer 410 generates electronic mailing documentation for the mailing prepared in the preceding blocks using an electronic method approved by the mailing service 420. This can ensure the mailing documentation is compatible with and readable by the mailing service's electronic systems. In one embodiment, the mailing documentation describes how individual mail pieces are linked to handling units, if any, and how handling units are linked to containers, if any.

Referring again to FIG. 8, upon the completion of the mail preparation and planning step at block 801, the mailer 410 can now transmit a pre-shipment notification to the mailing service 420 at block 802. In one embodiment, the pre-shipment notification includes the postage statements and mailing documentation prepared at blocks 904 and 905 in FIG. 9. In another embodiment, the mailing service 420 sends back a confirmation and an estimate of postage to the mailer 410 based on the pre-shipment notification. In yet another embodiment, scheduling information is exchanged electronically between the mailer 410 and the mailing service 420. At block 803, the mailing is transported to the mailing service 420 and inducted into the mail stream.

Figure 10:
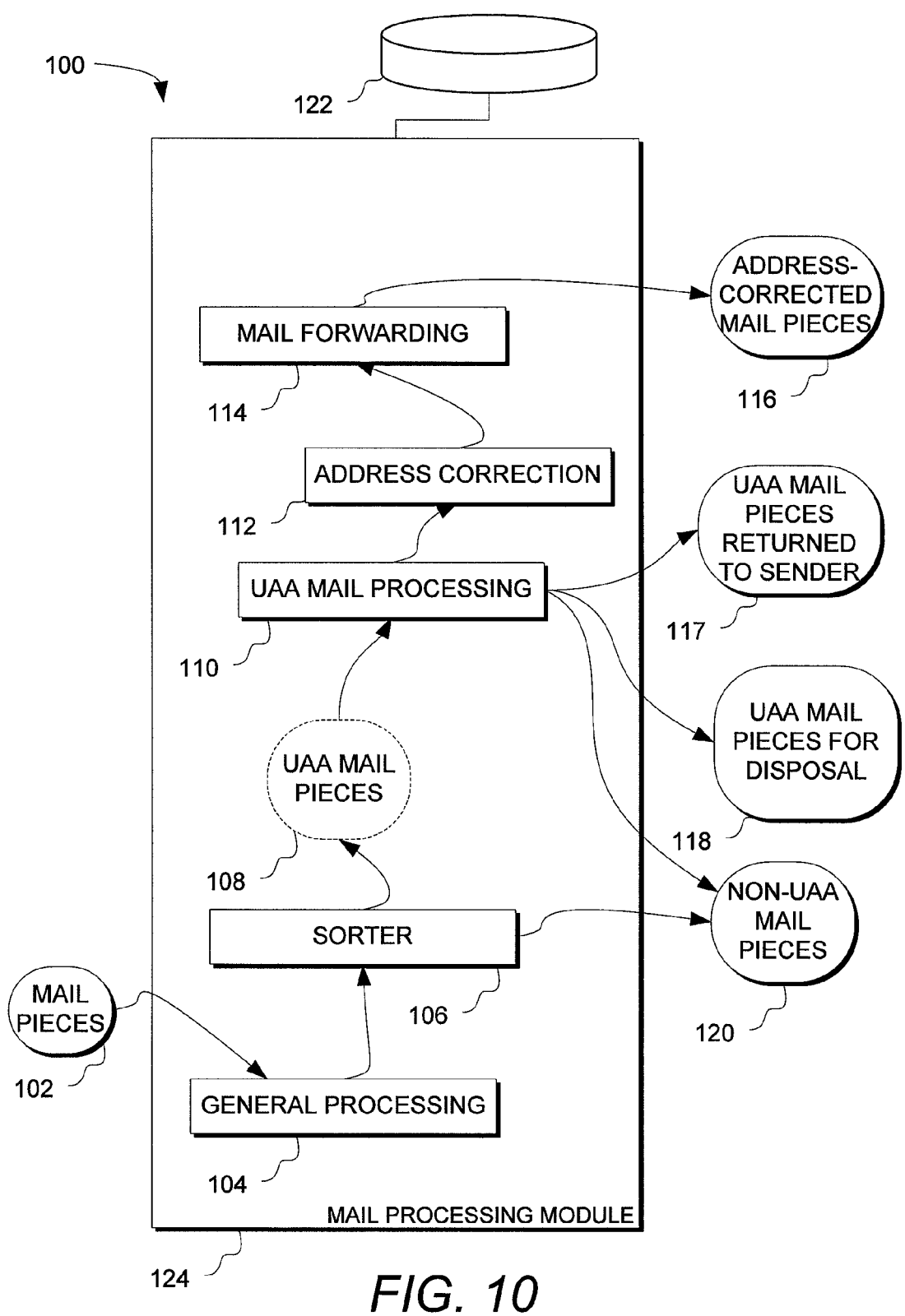
FIG. 10 is a block diagram illustrating one embodiment of a mail processing system using an intelligent barcode such as that illustrated in FIG. 1.

FIG. 10 is a top level block diagram illustrating in greater detail the mail processing which occurs at block 804 in FIG. 8. One embodiment of a mail processing system 100 for processing mail using the intelligent barcode 10 is illustrated. The mail processing system 100 includes mail pieces 102, a mail processing module 124, a general processing module 104, a sorting module 106, candidate UAA mail pieces 108, a UAA processing module 110, an address correction module 112, a mail forwarding module 114, address-corrected mail pieces 116, UAA mail pieces returned to sender 117, UAA mail pieces for disposal 118, non-UAA mail pieces 120, and a machine-readable medium 122. The mail pieces 102 that have been inducted into the mail stream at block 803 in FIG. 8 are introduced into the mail processing module 124 according to one embodiment. In one embodiment, the mail processing module 124 is a mail sorter. The mail pieces 102 are next evaluated at the general processing module 104. Methods performed by the general processing module 104 according to one embodiment are described in greater detail below with reference to FIG. 11. The mail pieces next move to the sorting module 106. The sorting module 106 may be a letter mail sorter, a flat mail sorter, a mixed mail sorter, a parcel mail sorter, or any other type of device that sorts mail pieces. Non-UAA mail pieces 120 leave the sorter 106 and the mail processing module 124 for final disposition through the mail stream.

In one embodiment, candidate UAA mail pieces 108 are mail pieces which are suspected to be UAA mail pieces but are not yet confirmed to be UAA mail pieces. The candidate UAA mail pieces 108 move from the sorting module 106 to the UAA processing module 110, or UAA module. In one embodiment, the candidate UAA mail pieces 108 are evaluated by the UAA processing module 110. In another embodiment, the UAA processing module 110 confirms the candidate UAA mail piece 108 is a confirmed UAA mail piece. In yet another embodiment, the UAA processing module 110 generates a report that a mail piece is undeliverable-as-addressed and transmits the report to the mailer 410 via the machine-readable medium 122. In some embodiments, these undeliverable-as-addressed reports are called "Nixie" reports.

In some aspects of the development, the UAA processing module 110 determines a UAA mail piece should be treated as waste and disposed. The UAA mail pieces for disposal 118 leave the UAA processing module 110 for disposal. In some aspects of the development, the UAA processing module 110 determines a UAA mail piece should be returned to the sender, or the mailer 410. The UAA mail pieces returned to sender 117 leave the UAA processing module 110 for return to the sender or the mailer 410.

In still other embodiments, the UAA processing module 110 determines address correction services are to be provided to a UAA mail piece. The addresses of the UAA mail pieces 108 can be corrected at the address correction module 112 in one embodiment, or, in another embodiment, at the UAA processing module 110. In some embodiments, address correction notices can also be generated at the address correction module 112 and transmitted to the mailer 410 via the machine-readable medium 122. In another embodiment, address correction notices are generated at the UAA processing module 110 and transmitted to the mailer 410 via the machine-readable medium 122. Other services that can be performed at the address correction module 112 will be described in greater detail below.

In some embodiments, address-corrected mail pieces 116 are moved to the mail forwarding module 114. One embodiment includes a mail forwarding module 114 that can generate and transmit a report to the mailer 410 that a mail piece will be or has been forwarded to a specific address. Such mail forwarding reports can include, but are not limited to, destination confirm services. The address-corrected mail pieces 116 leave the mail forwarding module 114 for final disposition through the mail stream.

A more detailed description of the systems and methods for sorting and determining the final disposition of mail will now be described. The mail processing module 124 includes the sorting module 106 and the UAA processing module 110. The sorting module 106 and the UAA processing module 110 may be software, hardware, firmware or a combination thereof. While the UAA processing module 110 is shown as being part of the mail processing module 124, embodiments are not so limited. In some embodiments, the UAA processing module 110 is separate from the sorting module 106. Alternatively or in addition, the functionality of the UAA processing module 110 may be incorporated into the sorting module 106.

The sorting module 106 receives mail pieces from the general processing module 104 and sorts the mail pieces. In some embodiments, the sorting module 106 sorts the mail pieces based on the intelligent barcode 10 or other encoded value, a delivery point bar code, or a combination thereof. The encoded value may be pre-printed onto the mail pieces by the mailer 410.

In some embodiments, the encoded value is used to perform some or all of the operations of UAA processing. The sorting module 106 can scan encoded values in the intelligent barcodes 10 affixed to mail pieces. As discussed above, encoded values may include different types of mail parameters for a mail piece, such as routing data (e.g., the delivery point), the mail class, the service type, the mailer identification number, identification of recipient, and address of the mailer 410. In some embodiments, the delivery point (decoded from the encoded value) may be used to determine whether a mail piece is a candidate UAA mail piece 108. In one embodiment, this determination is made at the sorting module 106. In some embodiments, the data decoded from the encoded value is also used to confirm that a candidate UAA mail piece 108 is an actual UAA mail piece, such as, for example, an address-corrected mail piece 116, a UAA mail piece returned to sender 117, or a UAA mail piece for disposal 118. In one embodiment, this confirmation is performed at the UAA processing module 110. In some embodiments, the data decoded from the encoded value is also used to determine final disposition of the confirmed actual UAA mail piece. In one embodiment, this determination is made at UAA processing module 110.

In some embodiments, the data decoded from the encoded value is also used to determine a return address of the mailer 410, or a sender of the mail piece (which may be used if the mail is an actual UAA mail piece). These example embodiments may be used in any combination. For example, in some embodiments, the data from the encoded value is used to determine whether the mail piece is a candidate UAA mail piece 108; used to confirm that a candidate UAA mail piece 108 is an actual UAA mail piece (such as, for example, an address-corrected mail piece 116, a UAA mail piece returned to sender 117, or a UAA mail piece for disposal 118); used to determine final disposition of the actual UAA mail piece; and used to determine a return address. In other examples, the data from the encoded value may be used to perform only one operation or less than all of the operations of UAA processing (as described above). For example, data from the encoded value may only be used to confirm that a candidate UAA mail piece 108 is an actual UAA mail piece. In another example, the data from the encoded value may only be used to determine final disposition of the actual UAA mail piece. Accordingly, if the encoded value is used for less than all of the operations for UAA processing, other data or other techniques may be used to perform these other operations.

In some embodiments, the encoded value (and/or the data decoded from the encoded value) may be correlated with the name of the mail recipient 470, or the recipient of the mail piece. For example, the encoded value, the data decoded from the encoded value, and the name of the recipient for a mail piece may be stored in a data structure within a database. This database may be stored in the machine-readable medium 122 that is local or remote to the mail processing facility. In some embodiments, parts of this data may be populated by the mailers 410, while others parts of this data may be populated by operations performed by mail processing equipment at the mailing service 420. For example, the mailers 410 may store the encoded value and the name of the recipient for a mail piece, while the operations of the mail processing equipment may cause storage of the data decoded from the encoded value. This data is then accessible by mail processing equipment during UAA processing at the UAA processing module 110. For example, the encoded value may be used as a key for looking up the name of the recipient in the machine-readable medium 122. The name of the recipient can then be used to determine at UAA processing module 110 whether a candidate UAA mail piece is confirmed to be an actual UAA mail piece.

Such embodiments are in contrast to conventional techniques for UAA processing of mail pieces. In particular, using conventional techniques, mail sorters can only detect if a mail piece is UAA. However, some mail sorters cannot determine final UAA disposition (Forward, Return to Sender, Treat as Waste and Dispose, etc.) for mail pieces. In particular, in order to determine final disposition other characteristics such as the mail class and service type need to be taken into account. Using conventional techniques, these additional characteristics can only be obtained by capturing and analyzing the image of a UAA mail piece using pattern recognition, Optical Character Recognition (OCR) methodologies or video coding techniques. As a result, the UAA mail pieces are re-processed on other OCR capable mail processing equipment to capture and analyze the mail class, service type, and return address. Subsequently, the final disposition of a UAA mail piece may be determined. This required additional processing results in a significant cost to mail processing.

In one embodiment illustrated in FIG. 10, the mail pieces 102 are passed to the sorting module 106 during a mail sort operation. The sorting module 106 may decode an encoded value located on a mail piece. The sorting module 106 and the UAA processing module 110 may perform some or all of the operations of UAA processing using the decoded data from the encoded value. For example, the sorting module 106 may identify mail pieces as candidate UAA mail pieces 108 by comparing a delivery point (encoded in the encoded value) to a table, list, or other data compilation of addresses of recipients of mail whose address has changed (hereinafter referred to as a change of address table). In particular, based on the delivery point, the sorting module 106 may be able to identify that one or more persons have changed addresses for this particular location. Multiple persons/entities may be having mail delivered to this particular location. Accordingly, one person for a given location may have changed addresses, while other persons for this location have not changed addresses. Therefore, until the recipient is identified, the mail piece is only a candidate UAA mail piece 108.

In some embodiments, the sorting module 106 may update a data entry in the machine-readable medium 122 for a given encoded value. As described above, in some embodiments, the mailers 410 may input data into the machine-readable medium 122 for access by the sorting module 106 or the UAA processing module 110. For example, the mailers 410 may create an entry, table, array or any other type of data structure for a given encoded value. Within that entry in the machine-readable medium 122, the mailers 410 may include the name of the recipient of the mail piece for the given encoded value. In some embodiments, this input of data by the mailers 410 may be performed prior to the mail pieces being sorted by the mail processing module 124. In some embodiments, the mailers 410 may perform updates to the machine-readable medium 122 on a periodic basis or as mailers 410 submit new mail pieces for sorting.

In conjunction with decoding the encoded value, the sorting module 106 may add the decoded data into the associated data structure for the encoded value. In particular, the sorting module 106 may store some or all of the parts of the decoded data for this encoded value. Moreover, in some embodiments, the decoded data is provided to the mailers 410. For example, the mailers 410 may have subsequent access to the machine-readable medium 122 to access their encoded values. Alternatively or in addition, this decoded data may be transmitted electronically or provided in a hard copy format to the mailers 410. Accordingly, the sorting module 106 may perform the updates to the machine-readable medium 122 and transmit the decoded data to the associated mailers 410, as part of the decoding operation. The sorting module 106 may perform the updates and/or the data transmission in real time or non-real time relative to the decoding operation. For example, the sorting module 106 may perform the updates to the machine-readable medium 122 in real time. Subsequently, the sorting module 106 may transmit the decoded data to the mailers 410 in non-real time.

If the sorting module 106 identifies the mail piece as a candidate UAA mail piece 108, the sorting module 106 may pass the UAA mail pieces 108 to the UAA processing module 110 for further processing. The sorting module 106 outputs non-UAA mail pieces 120 for final disposition through the mail stream. In one embodiment, the UAA processing module 110 determines that a candidate UAA mail piece 108 is actually a non-UAA mail piece 120, and outputs the non-UAA mail piece 120 from the mail processing module 124 for final disposition through the mail stream. For a candidate UAA mail piece 108, the UAA processing module 110 determines whether the UAA mail piece is confirmed to be an actual UAA mail piece. In some example embodiments, the UAA processing L module 110 uses data decoded from the encoded value to perform this confirmation. Moreover, for those actual UAA mail pieces, the UAA processing module 110 determines a final disposition for the UAA mail piece. In some example embodiments, the UAA processing module 110 uses data decoded from the encoded value to determine this final disposition.

The machine-readable medium 122 may be volatile and/or non-volatile media, such as but not limited to read only memory (ROM), random access memory (RAM), magnetic disk storage media, optical storage media, and flash memory devices. The machine-readable medium 122 may be local or remote relative to the mail processing module 124. For example, in some embodiments, the machine-readable medium 122 may be representative of machine-readable media distributed at different locations under the control of the mailers 410. Accordingly, the mailer 410 may have its own machine-readable medium 122 that is accessible remotely by the mailing service 420. Alternatively or in addition, the machine-readable medium 122 may be located at the mail processing facility (which is local to the mail processing module 124). In some embodiments, the machine-readable medium 122 stores data related to, extracted from, etc. the encoded values. For example, for a given encoded value, an entry in the machine-readable medium 122 may include the encoded value, the name of the recipient of the mail piece, customer identification number for the mailer, and the mail class, service type, and return address for the mail piece. In some example embodiments, parts of this data (e.g., the encoded value and the name of the recipient) are populated by the mailer 410. For example, the populating of this data may be a requirement for qualification for incentives, such as those associated with full service mailings. Some mailers 410 may desire to keep the names of the recipients of the mail pieces confidential. In some embodiments, the names of the recipients may be stored in a separate machine-readable medium 122 (e.g., a machine-readable medium under the control of the mailer 410). Alternatively or in addition, the names of the recipients may be encrypted.

In certain embodiments, the operations are performed by instructions residing on machine-readable media (e.g., software), while in other embodiments, the methods are performed by hardware or other logic (e.g., digital logic).

Figure 11:
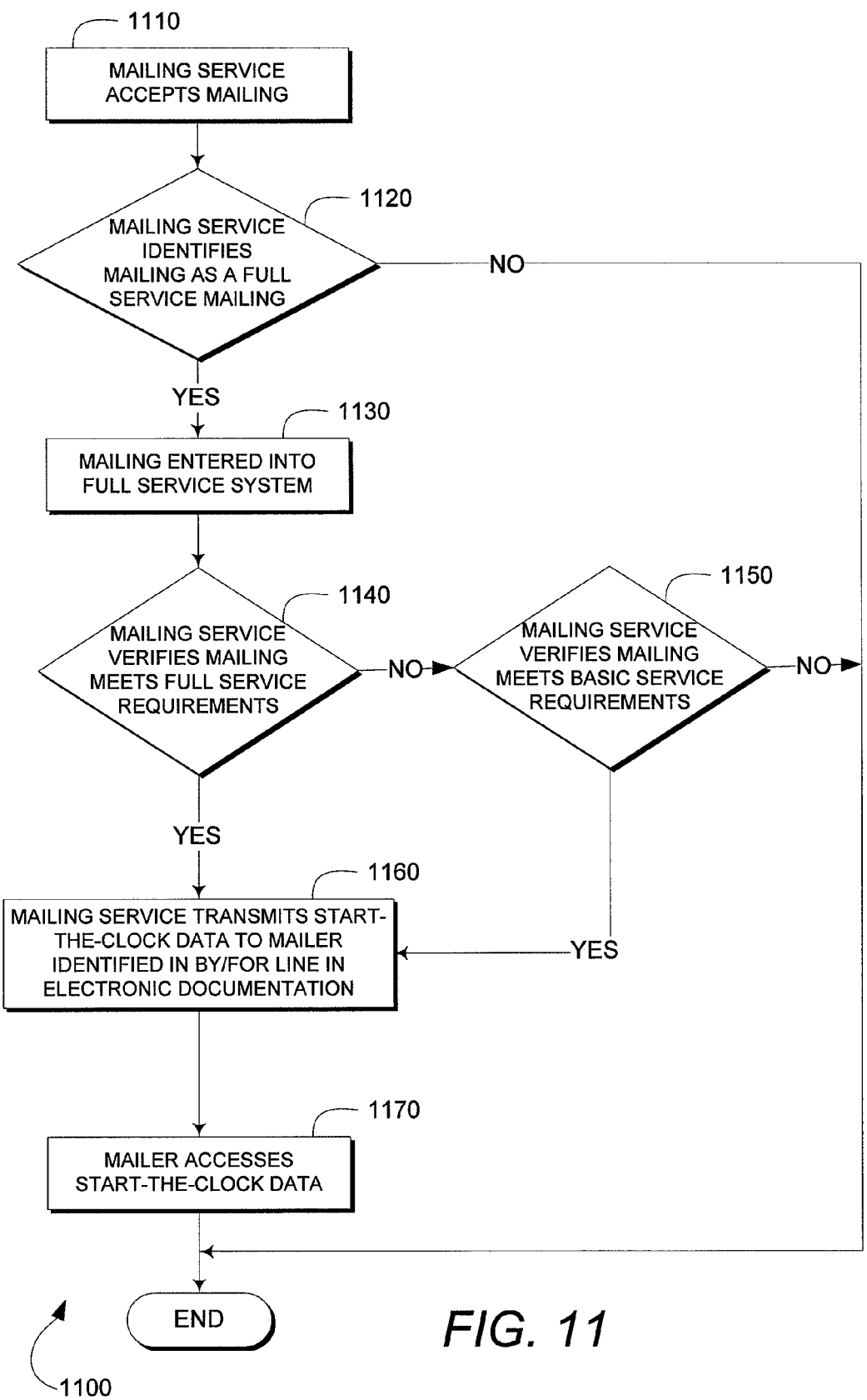
FIG. 11 is a flowchart illustrating one embodiment of a method of processing mail using an intelligent barcode such as that illustrated in FIG. 1.

FIG. 11 is a flowchart illustrating in greater detail a method 1100 performed by the general processing module 104 in FIG. 10. One embodiment of a method 1100 for generally processing a mailing using intelligent barcode 10 is illustrated. The method 1100 begins at block 1110 in which the mailing service 420 accepts a mailing inducted into the mail stream. Moving to a block 1120, the mailing service 420 preliminarily determines if the mailing using the intelligent barcodes 10 and meets full service requirements, as described in greater detail above. Persons of skill in the art will understand full service requirements are not limited to those described, and any single requirement or combination of requirements that assists the mailing service 420 in the provision of acceptance, sorting, tracking, address correction, forwarding, and delivery services can be used to qualify a mailing as "full service." In one embodiment, if the mailing is not preliminarily identified as a full service mailing at block 1120, general processing terminates and the mailing moves to the sorting module 106 in FIG. 10. If the mailing is preliminarily identified as a full service mailing at block 1120, the mailing is entered into the full service system at block 1130.

Moving next to block 1140, the mailing service 420 verifies the mailing meets all full service requirements. This verification can include, for example, verifying that postage statements and mailing documentation for this mailing have been received by the mailing service 420. This verification can also include, for example, verifying that mail pieces are linked to handling units as indicated in the mailing documentation, and handling units are linked to containers as indicated in the mailing documentation. Persons of skill in the art will understand the mailing service 420 may evaluate a sample of mail pieces in a mailing to verify compliance with full service requirements. If the mailing does not meet all full service requirements, the mailing service 420 next verifies if the mailing meets basic service requirements at block 1150. This verification can include, for example, verifying that the intelligent barcodes 10 have been affixed to all mail pieces. Verification can also include, for example, that the intelligent barcodes 10 are properly positioned on and affixed to the mail piece, are readable, and conform to formatting requirements for the intelligent barcodes 10. Persons of skill in the art will understand the mailing service may evaluate a sample of mail pieces in a mailing to verify compliance with basic service requirements.

If the mailing does not meet basic service requirements at block 1150, general processing terminates and the mailing moves to the sorting module 106 in FIG. 10. If the mailing does meet basic service requirements at block 1150, the mailing service 420 may offer all or subset of services offered to full service mailings to the basic service mailing. For example, in the embodiment illustrated in FIG. 11, the mailing service 420 provides at block 1160 a start-the-clock service to mailings that meet basic service requirements, wherein the start-the-clock service is also provided to full service mailings. In one embodiment, basic service mailings receive some, but not all, of the incentives and/or additional services provided to mailings that meet all full service requirements. In another embodiment, the mailing service 420 does not offer any additional services to basic service mailings, and merely tracks and analyzes the number of incoming mail pieces that meet basic service requirements.

If the mailing service 420 verifies the mailing meets all full service requirements at block 1140, the process moves to block 1160, wherein full service mail pieces receive the benefit of a start-the-clock service. In one embodiment of the start-the-clock service, the mailing service 420 transmits start-the-clock data to the mailer 410, including but not limited to the mail preparer and/or mail owner identified in the By/For line in the mailing documentation associated with the mailing. In one embodiment, the start-the-clock data includes information that a mailing or specific pieces of mail in a mailing have been inducted into the mail stream. In another embodiment, the start-the-clock data includes information that a mailing or specific pieces of mail in a mailing have been verified and accepted into the full service system.

Moving to block 1170, the mailer 410, including but not limited to the mail preparer and/or mail owner, accesses the start-the-clock data via the machine-readable medium 122. In one embodiment, a mail preparer plans, prepares, and transmits a mailing to the mailing service 420 for a mail owner. The mail owner can access the start-the-clock data on its mailings to evaluate the performance of the mail preparer, including but not limited to the timeliness and quality of the mailing and the quality of the intelligent barcodes 10 used in the mailing.

Figure 12:
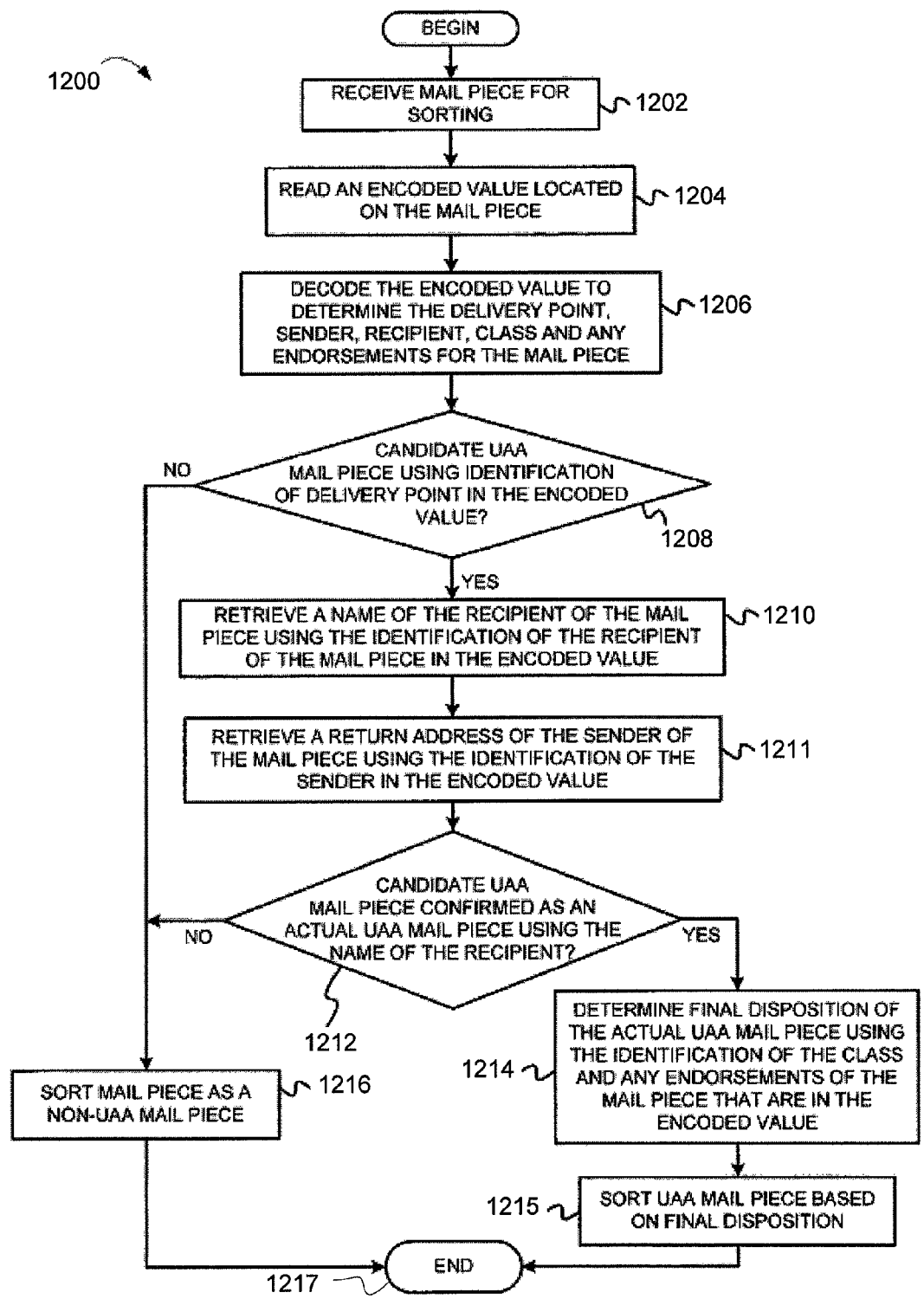
FIG. 12 is a flowchart illustrating one embodiment of a method of sorting and processing undeliverable-as-addressed mail using an intelligent barcode such as that illustrated in FIG. 1.

FIG. 12 is a flowchart illustrating one embodiment of a method 1200 performed by the sorting module 106 and/or the UAA processing module 110 in FIG. 10. In some embodiments, the method 1200 is performed by at least one of the sorting module 106 and the UAA processing module 110. The method 1200 begins at block 1202 in which the sorting module 106 receives a mail piece for sorting. The mail pieces may comprise both UAA and non-UAA mail pieces. In some example embodiments, the mailer 410 prints, marks, attaches, etc. an encoded value onto an outside part of the mail pieces. Moving to a block 1204, the sorting module 106 reads the encoded value located on the mail piece. The encoded value may be a bar code, an alphanumeric value, etc. For example, in some embodiments, the encoded value is the intelligent barcode 10. Therefore, in some examples, the sorting module 106 uses some type of bar code scan operation to read the encoded value.

Next at block 1206, the sorting module 106 decodes the encoded value to determine some or all of the following data: (1) the delivery point for the mail piece; (2) an identification and return address of the mailer 410; (3) the class of the mail piece and (4) any endorsements (service types) for the mail piece. Other types of data (e.g., mailing sequence number) may also be decoded from the encoded value.

In some embodiments, the sorting module 106 may update the data entry in the machine-readable medium 122 for this given encoded value. In conjunction with decoding the encoded value, the sorting module 106 may add the decoded data into the associated data structure for the encoded value. In particular, the sorting module 106 may store some or all of the parts of the decoded data for this encoded value. Moreover, in some embodiments described in greater detail above, the decoded data is provided to the mailers 410.

Moving next to block 1208, the sorting module 106 determines whether the mail piece is a candidate UAA mail piece 108 using the identification of the delivery point decoded from the encoded value. The sorting module 106 may compare the delivery point bar code to a table, list, etc. of addresses of recipients of mail whose address has changed. Such data may be stored in the machine-readable medium 122 or some other form of machine-readable media. If the delivery point bar code for a mail piece is within this list of addresses, the sorting module 106 identifies the mail piece as a candidate UAA mail piece 108. As described below, further confirmation and final disposition of a candidate UAA mail piece 108 is performed in subsequent operations. While described such that the sorting module 106 obtains the delivery point from the encoded value, embodiments are not so limited. In some example embodiments, the delivery point may be obtained from a delivery point bar code that is also located on the mail piece. Barcode 30 of FIG. 2 is one example of a delivery point bar code according to one embodiment. If the mail piece is not a candidate UAA mail piece 108, the method 1200 continues at block 1216, described in more detail below.

If the mail piece is a candidate UAA mail piece 108, the method 1200 continues at block 1210. At block 1210, the UAA processing module 110 retrieves the name of the recipient of the mail piece using the identification of the recipient of the mail piece in the encoded value. The UAA processing module 110 may retrieve the name of the recipient of the mail piece from the machine-readable medium 122. In particular, as described above, in some embodiments, the mailer 410 stores the name of the recipient into the machine-readable medium 122. Accordingly, the UAA processing module 110 may retrieve the recipient name from the machine-readable medium 122. In some embodiments, the UAA processing module 110 may perform the lookup based on the identification of the recipient (that was part of the decoded data from the encoded value), the encoded value, etc.

Moving next to block 1211, the UAA processing module 110 retrieves the return address of the mailer 410 of the mail piece using the identification of the mailer 410 of the mail piece in the encoded value. The UAA processing module 110 may retrieve the return address of the mailer 410 from the machine-readable medium 122. In particular, in some embodiments, the mailer 410 of the mail piece stored its return address into the machine-readable medium 122. Accordingly, the UAA processing module 110 may retrieve the return address from the machine-readable medium 122. In some embodiments, the UAA processing module 110 may perform the lookup based on the identification of the mailer 410 (that was part of the decoded data from the encoded value), the encoded value, etc. In some embodiments, the return address may be used if the mail piece is returned to the mailer 410 as part of the final disposition of the actual UAA mail piece. Embodiments are not limited to obtaining the return address of the mailer 410 as described in the operation at block 1211. Alternatively or in addition, in some example embodiments, the return address of the mailer 410 may be obtained by other techniques, such as OCR.

Next at block 1212, the UAA processing module 110 determines whether the candidate UAA mail piece 108 is confirmed to be an actual UAA mail piece using the name of the recipient. In some embodiments, the UAA processing module 110 determines if the recipient's name for this mail piece is in an entry in the change of address table for this delivery point. As described above, multiple recipients of mail pieces may be associated with a given delivery point. If the recipient's name on the mail piece is in the change of address table, the mail piece is considered to be a UAA mail piece. Otherwise, the mail piece is processed as a non-UAA mail piece. If the mail piece is not confirmed to be a UAA mail piece, the method continues at block 1216, which is described in more detail below.

If the mail piece is confirmed to be a UAA mail piece, the method continues at block 1214. The UAA processing module 110 determines final disposition of the actual UAA mail piece using the identification of the class and any endorsements of the mail piece that are indicated on the mail piece, including but not limited to any endorsements in the encoded value. Because the UAA mail piece is confirmed as an actual UAA mail piece, final disposition may occur. As illustrated in FIG. 10, UAA mail pieces for disposal 118, UAA mail pieces returned to sender 117, and address-corrected mail pieces 116 are confirmed as actual UAA mail pieces. In some example embodiments, final disposition may include returning the mail piece to the mailer 410, forwarding to a new address, or treating as waste. Final disposition may depend on the class of mail, the length of time since the address has changed, mailer applied endorsements, etc. For example, if the mail piece is first class mail and the length of time is less than N number of months, the mail piece is labeled for forwarding to the new address. In another example, if the mail piece is standard A class mail and the length of time is greater than X number of days and there are no services requested (endorsements), the mail piece is treated as waste. As illustrated in FIG. 10, the final disposition of UAA mail pieces for disposal 118 is treatment as waste and disposal. The final disposition of UAA mail pieces 117 is to be returned to the mailer 410. The final disposition of address-corrected mail pieces 116 is forwarding to the mail recipient 470 at a new, corrected address.

Moving next to block 1215, the UAA processing module 110 sorts the mail piece based on the final disposition. The UAA processing module 110 can sort the mail piece in accordance with the type of final disposition. For example, the UAA mail piece may sort into three different groups depending on the type of final disposition: return the mail piece to the mailer 410; forward to a new address; or treat the mail piece as waste. Once sorted, the UAA mail pieces may then be processed differently depending on their grouping. For example, if the mail piece is returned to the mailer 410, the mail piece could be mailed to the return address for the mailer 410. In some example embodiments, the return address may be retrieved based on the mailer identification that is decoded from the encoded value. In another embodiment, the UAA processing module 110 transmits actual UAA mail pieces sorted for forwarding to a new address to the address correction module 112 for address correction services. The process then moves to block 1217 and ends.

From block 1208 if the mail piece is not a candidate UAA mail piece 108 or from block 1212 if the mail piece is not confirmed to be a UAA mail piece, the process moves to block 1216, wherein the sorting module 106 sorts the mail piece as a non-UAA mail piece 120. The sorting module 106 may perform this sort using the delivery point, which may or may not be derived from the encoded value. The process then moves to block 1217 and ends.

Figure 13:
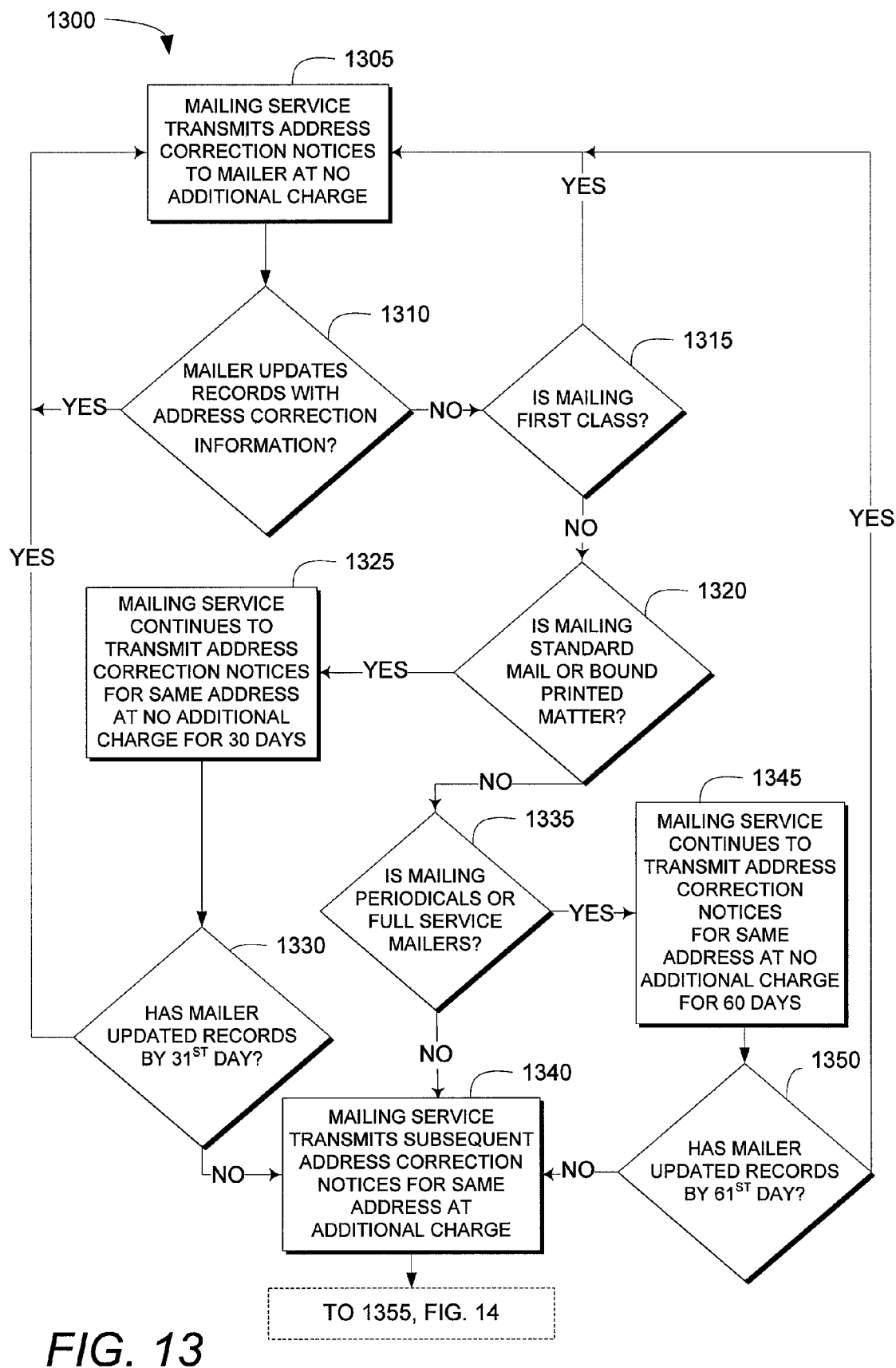
FIG. 13 is a flowchart illustrating one embodiment of a method of providing address correction services using an intelligent barcode such as that illustrated in FIG. 1.

FIG. 13 is a flowchart illustrating an embodiment of a method 1300 performed by the address correction module 112 in FIG. 10. The method 1300 can be used to generate, transmit, update, and receive address correction notices in real time or non-real time. As used herein, address correction notices are not limited to reports indicating an address correction. Address correction notices, as used herein, can include but are not limited to reports that a piece of mail is undeliverable-as-addressed ("Nixie" report); reports indicating the final disposition of a UAA mail piece (i.e., forward with address correction, return to sender, treat as waste and dispose); reports indicating a change of address has been applied to a UAA mail piece and providing the new address; and reports indicating an address-corrected mail piece has been forwarded to the new address. The method 1300 can be used to provide any single report, or a combination of reports, to a mailer 410. Persons of skill in the art will understand the method 1300 is not limited to the address correction reports detailed above, but can be used to furnish any other suitable type of data or information to a mailer 410 that will assist a mailing service 420 in the provision of acceptance, sorting, tracking, address correction, forwarding, and delivery services.

The method 1300 begins at block 1305 in which a mailing service 420 transmits address correction notices for a first full service mailing to a mailer 410 at no additional charge. As described herein, the mailer 410 can include but is not limited to a mail preparer, a mail owner, or a system for sending mail. Thus, in one embodiment, the mailer 410 will not be charged an additional fee for address correction notices over the full service postage rate already applied to the mail pieces in the first full service mailing. In one embodiment, the provision of address correction notices at no additional charge is an incentive offered by the mailing service 420 to mailers 410 to encourage their use of the intelligent barcode 10 and compliance with full service requirements. As described in greater detail above, the sorting module 106, the UAA processing module 110, the address correction module 112, and/or the mail forwarding module 114 may transmit data or reports to the machine-readable medium 122, transmit hardcopy reports to the mailer 410, or both.

Moving to a block 1310, the mailer 410 may receive and analyze address correction information on the first mailing from the mailing service 420. In some embodiments, for example, block 1310 in FIG. 13 corresponds with block 805 in FIG. 8. In one embodiment, the mailer 410 may access the data and/or reports at the machine-readable medium 122 in real time, receive hardcopy data and/or reports in non-real time, or both. If the mailer 410 updates its address records with the transmitted address correction information from the mailing service 420, the method 1300 moves back to block 1305. At block 1305, the mailing service 420 transmits address correction notices for a second or subsequent full service mailing to the mailer 410 at no additional charge. In some embodiments, the mailing service 420 can determine that the mailer 410 has updated its address records at block 1310 by tracking whether the mailing service 420 has generated and transmitted a repeat address correction report to the same mailer 410 for the same address. In other embodiments, the mailing service 420 can determine that the mailer 410 has updated its address records at block 1310 by analyzing all or a portion of the address records associated with the mailer 410 in the machine-readable medium 122.

If the mailing service 420 determines the mailer 410 has not updated its address records for the first mailing at block 1310, the method continues to block 1315. In one embodiment, the mailing service 420 determines at block 1315 if the second or subsequent full service mailing from the mailer 410 is First-Class mail. In one embodiment, the mail service 420 determines the service type of the mailing based on the encoded value for Service Type in the intelligent barcode 10 affixed to a mail piece, a handling unit, or container of the mailing. If the second or subsequent mailing is First-Class, the method moves back to block 1305. At block 1305, the mailing service 420 transmits address correction notices for the second or subsequent full service mailing to the mailer 410 at no additional charge. In one embodiment, the mailing service 420 will transmit address correction notices at no additional charge for subsequent full service First-Class mailings, with no limit on the number or length of time address correction notices will be provided. In some embodiments, the unlimited provision of address correction notices for First-Class full service mailings, despite the mailer's failure to update its address correction records, is a benefit of using a service type that requires payment of a higher postage rate than other service types, such as the First-Class service type.

If it is determined in block 1315 that the second or subsequent mailing is not First-Class, the method moves next to block 1320. In one embodiment, the mailing service 420 determines at block 1320 if the second or subsequent full service mailing is Standard Mail or Bound Printed Matter (BPM). In one embodiment, the mail service 420 determines the service type of the mailing based on the encoded value for Service Type in the intelligent barcode 10 affixed to a mail piece, a handling unit, or container of the mailing. If the second or subsequent mailing is Standard Mail or BPM, the method moves to block 1325.

At block 1325, the mailing service 420 continues to transmit address correction notices to the same mailer 410 for the same address at no additional charge for a period of time. In one embodiment, the provision of address correction notices at no additional charge continues for 30 days. Method 1300 then continues to block 1330, described in greater detail below.

If it is determined in block 1320 that the second or subsequent mailing is not Standard Mail or BPM, the method continues to block 1335. In one embodiment, the mailing service 420 determines at block 1335 if the second or subsequent full service mailing is Periodicals or Full Service Mailers. In one embodiment, the mail service 420 determines the service type of the mailing based on the encoded value for Service Type in the intelligent barcode 10 affixed to a mail piece, a handling unit, or container of the mailing. If the second or subsequent mailing is not Periodicals or Full Service mailers, the method moves to block 1340, described in greater detail below. If the second or subsequent mailing is Periodicals or Full Service Mailers, the method moves to block 1345. At block 1345, the mailing service 420 continues to transmit address correction notices to the same mailer 410 for the same address at no additional charge for a period of time. In one embodiment, the provision of address correction notices at no additional charge continues for 60 days.

Next at block 1350, the mailing service 420 determines if the mailer 410 has updated its address records based on the transmission of address correction records by the mailing service 420. In one embodiment, the mailing service 420 determines if the mailer 410 has updated its address records within 60 calendar days of transmission of the first address correction report for a given address. If the mailer 410 has updated its address records using address correction reports provided by the mailing service 420, the method continues to block 1305.

Next at block 1305, the mailing service 420 transmits address correction notices for a third or subsequent full service mailing to the mailer 410 at no additional charge. In some embodiments, the mailing service 420 can determine that the mailer 410 has updated its address records at block 1350 by tracking whether the mailing service 420 has generated and transmitted a repeat address correction report to the same mailer 410 for the same address more than 60 calendar days after the transmission of the first address correction report for that address. In other embodiments, the mailing service 420 can determine that the mailer 410 has updated its address records at block 1350 by analyzing all or a portion of the address records associated with the mailer 410 in the machine-readable medium 122 on the 61st day after the transmission of the first address correction report to the mailer 410 for a particular address.

If it is determined in block 1350 that the mailer 410 has not updated its address records using address correction reports provided by the mailing service 420, the process moves to block 1340 wherein the mailing service 420 transmits address correction reports for the same address in subsequent full service mailings at an additional charge to the mailer 410. Method 1300 then continues to block 1355, discussed in greater detail below with reference to FIG. 14.

Referring again to block 1330, the mailing service 420 determines if the mailer 410 has updated its address records based on the transmission of address correction records by the mailing service 420. In one embodiment, the mailing service 420 determines if the mailer 410 has updated its address records within 30 calendar days of transmission of the first address correction report for a given address. If the mailer 410 has updated its address records using address correction reports provided by the mailing service 420, the method continues to block 1305.

Next at block 1305, the mailing service 420 transmits address correction notices for a third or subsequent full service mailing to the mailer 410 at no additional charge. In some embodiments, the mailing service 420 can determine that the mailer 410 has updated its address records at block 1330 by tracking whether the mailing service 420 has generated and transmitted a repeat address correction report to the same mailer 410 for the same address more than 30 calendar days after the transmission of the first address correction report for that address. In other embodiments, the mailing service can determine that the mailer 410 has updated its address records at block 1330 by analyzing all or a portion of the address records associated with the mailer 410 in the machine-readable medium 122 on the 31st day after the transmission of the first address correction report to the mailer 410 for a particular address.

If it is determined in block 1330 that the mailer 410 has not updated its address records using address correction reports provided by the mailing service 420, the process moves to block 1340 wherein the mailing service 420 transmits address correction reports for the same address in subsequent full service mailings at an additional charge to the mailer 410. Method 1300 then continues to block 1355, discussed in greater detail below with reference to FIG. 14.

Referring again to block 1335, if the mailing service 420 determines the second or subsequent full service mailing is not Periodicals or Full Service Mailers, the process moves to block 1340 wherein the mailing service 420 transmits address correction reports for the same address in subsequent full service mailings at an additional charge to the mailer 410. Method 1300 then continues to block 1355, discussed with reference to FIG. 14.

Figure 14:
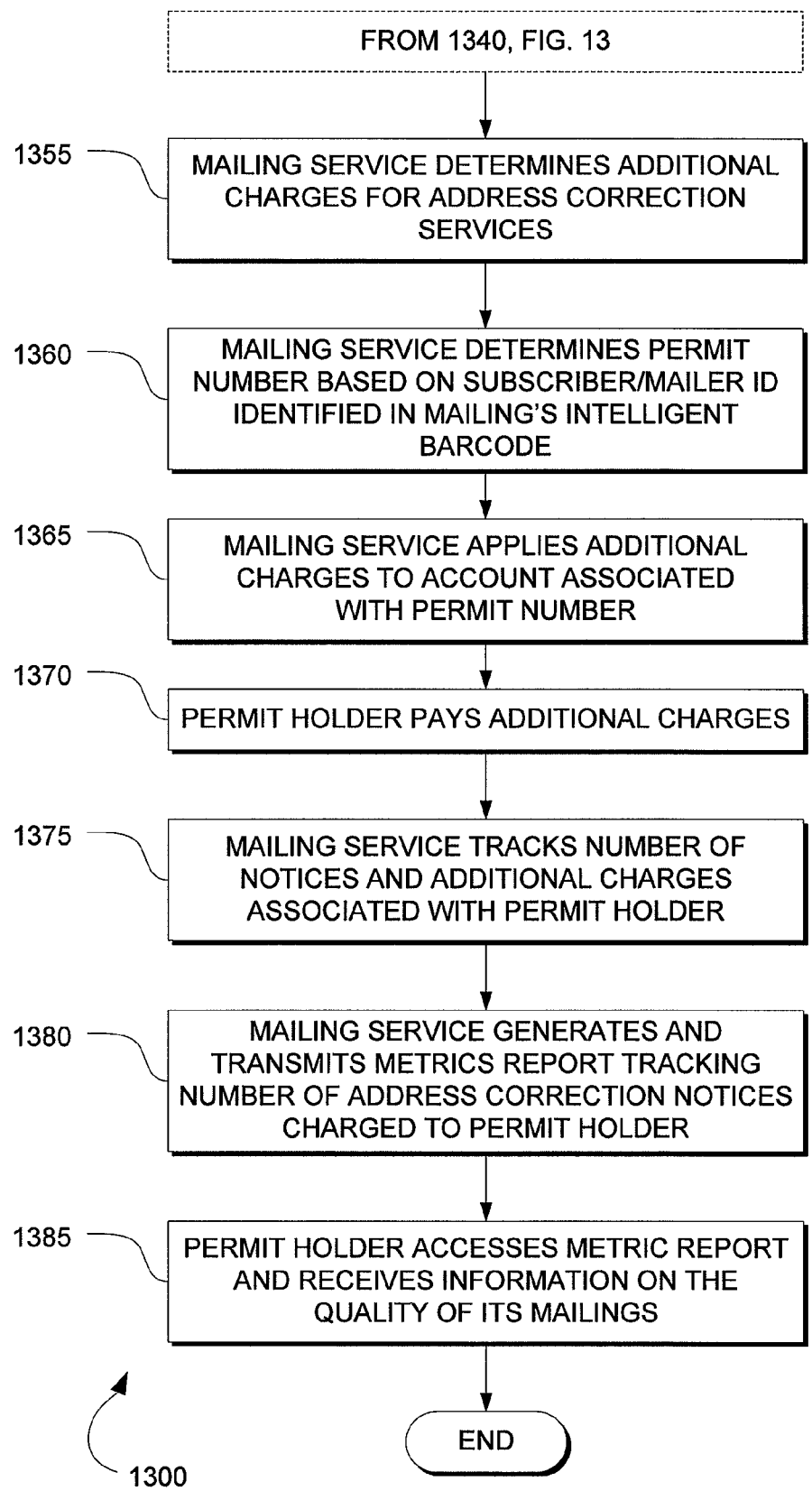
FIG. 14 is a continuation of the method illustrated in the flowchart of FIG. 13.

FIG. 14 is a continuation of the flowchart in FIG. 13 illustrating an embodiment of a method 1300 performed by the address correction module 112 in FIG. 10. The method 1300 continues at block 1355 in which the mailing service 420 determines applicable additional charges for address correction services, such as those described above with reference to FIG. 13. Moving to a block 1360, the mailing service 420 determines the payment account of the mailer 410 who prepared the mailing incurring additional charges. In one embodiment, the mailing service 420 determines the payment account by reference to a permit number. The permit number can be a unique number assigned, for example, to the mailer 410 as a condition of using the mailing service or a prerequisite for inducting full service mailings into the mail stream. In one embodiment, the mailing service 420 determines the permit number based on the Subscriber/Mailer ID identified in the intelligent barcode 10 affixed to mail pieces in the mailing, or to handling units or containers in the mailing.

Next at block 1365, the mailing service 420 applies the applicable additional charges determined at block 1355 to the payment account associated with the permit number or other unique identifier determined at block 1360. Moving to block 1370, the permit holder associated with the permit number, including but not limited to the mailer 410, accesses its payment account and pays the additional charges for address correction services on its mailing. The permit holder may be the mail preparer, the mail owner, or a system for sending mail as described in greater detail above.

Next at block 1375, the mailing service 420 tracks the number of address correction notices and additional charges associated with a particular payment account and/or permit holder. Moving next to block 1380, the mailing service 420 generates and transmits a report tracking the number of address correction notices charged to the payment account and/or permit holder associated with the account. The report can be, for example, a metrics report providing data or information on the additional charges incurred. Such data or information can include, but is not limited to, information identifying the mailing that incurred additional charges, the number of mail pieces in the mailing that incurred additional charges, the reason additional charges were applied, the number of repeat address correction reports that have been transmitted for a particular address on a mail piece in the mailing, actual time between transmission of an address correction report and correction of the mailer's address records, and average time between transmission of an address correction report and correction of the mailer's address records. In one embodiment, the report includes data or information that reflects or affects payments and/or fees to be paid by the mailer 410.

Next at block 1385, the permit holder, such as but not limited to the mailer 410, accesses the metrics or other report associated with its payment account and receives information on the quality of its mailings. Persons of skill in the art will understand that the operations described with reference to blocks 1375, 1380, and 1385 can occur in real-time with the use of the machine-readable medium 122. Thus, the mailing service 420 can offer sorting, tracking, address correction, and mail forwarding services to the mailer 410, while also allowing the mailer 410 real-time visibility into the services being provided and real-time feedback on the quality of its mailings. Those of skill in the art will understand the method 1300 is not limited to the provision of address correction services and address correction notices, but can include any service or notice that will assist a mailing service 420 in the provision of acceptance, sorting, tracking, address correction, forwarding, and delivery services.

Persons of skill in the art will also understand that the systems and methods described herein are not limited to those using the intelligent barcode 10. The systems and methods can use any encoded value or numerical representation that offers a sufficient data payload to support one or more mailing services.

Figure 15:
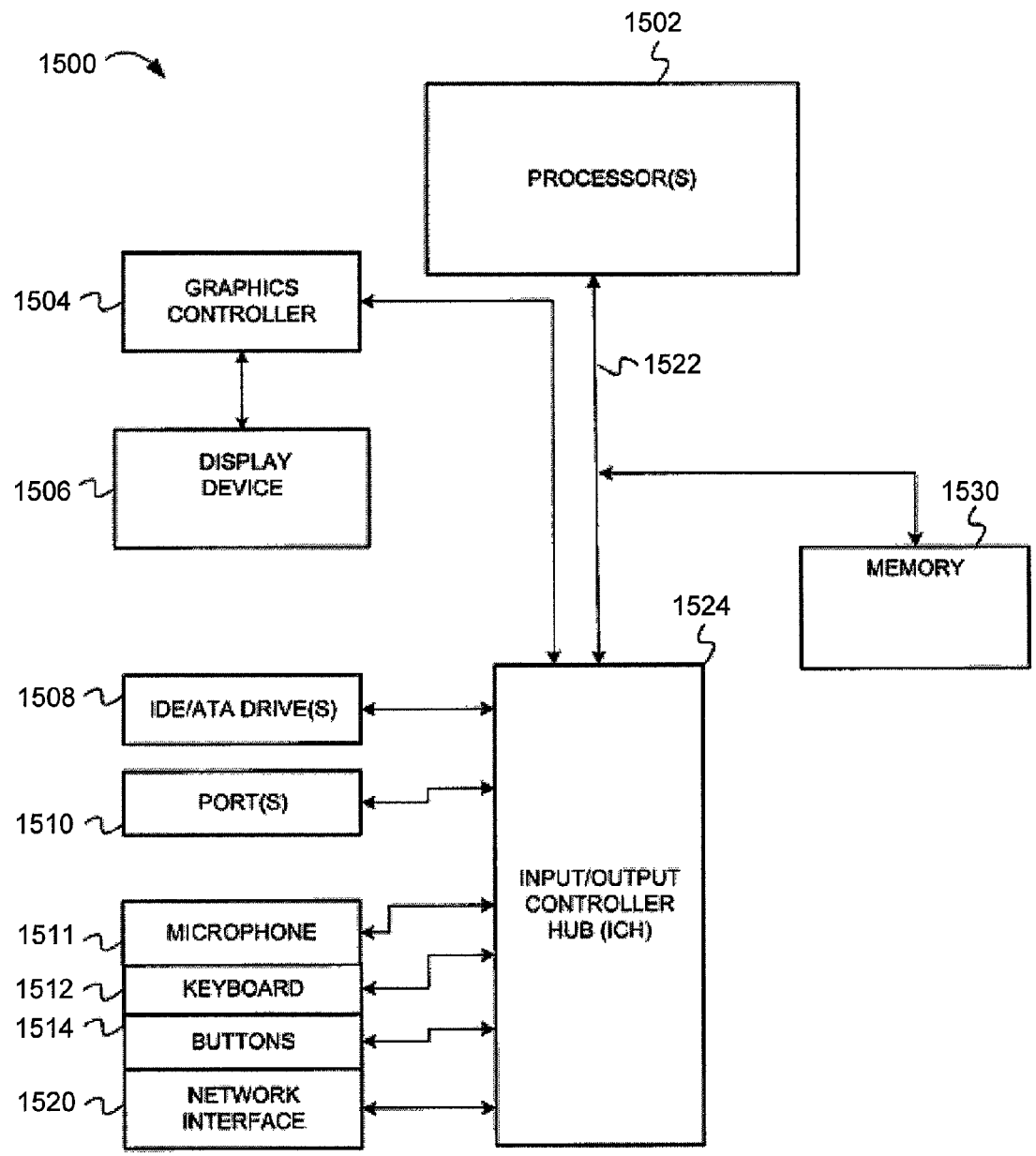
FIG. 15 is a block diagram illustrating one embodiment of a computer system that can be used in mail planning and processing methods and systems such as those illustrated in FIGS. 8 through 14.

A detailed block diagram of an example computer environment, according to some embodiments, is now described. In particular, FIG. 15 illustrates a computer that may be used for processing of UAA mail pieces, according to some example embodiments. In some example embodiments, the computer system 1500 may be representative of parts of the mail processing module 124, the sorting module 106, or the UAA processing module 110.

As illustrated in FIG. 15, the computer system 1500 comprises a processor(s) 1502. The computer system 1500 also includes a memory unit 1530, a processor bus 1522, and an Input/Output controller hub (ICH) 1524. The processor(s) 1502, the memory unit 1530, and the ICH 1524 are coupled to the processor bus 1522. The processor(s) 1502 may comprise any suitable processor architecture. The computer system 1500 may comprise one, two, three, or more processors, any of which may execute a set of instructions in accordance with embodiments of the development.

The memory unit 1530 may store data and/or instructions, and may comprise any suitable memory, such as a dynamic random access memory (DRAM). The computer system 1500 also includes an IDE drive(s) 1508 and/or other suitable storage devices. A graphics controller 1504 controls the display of information on a display device 1506, according to some embodiments of the development.

The input/output controller hub (ICH) 1524 provides an interface to I/O devices or peripheral components for the computer system 1500. The ICH 1524 may comprise any suitable interface controller to provide for any suitable communication link to the processor(s) 1502, the memory unit 1530, and/or to any suitable device or component in communication with the ICH 1524. In one embodiment of the development, the ICH 1524 provides suitable arbitration and buffering for each interface.

For some embodiments of the development, the ICH 1524 provides an interface to one or more suitable integrated drive electronics (DE) drives 1508, such as a hard disk drive (HDD) or compact disc read only memory (CD ROM) drive, or to suitable universal serial bus (USB) devices through one or more USB ports 1510. For one embodiment, the ICH 1524 also provides an interface to a microphone 1511, a keyboard 1512, a mouse or buttons 1514, a CD-ROM drive 1518 (not illustrated), and one or more suitable devices through one or more Firewire ports (not illustrated). For one embodiment of the development, the ICH 1524 also provides a network interface 1520 though which the computer system 1500 can communicate with other computers and/or devices.

In some embodiments, the computer system 1500 includes a machine readable medium that stores a set of instructions (e.g., software) embodying any one, or all, of the methodologies described herein. Furthermore, software may reside, completely or at least partially, within the memory unit 1530 and/or within the processor(s) 1502.

In view of the above, one will appreciate that the development overcomes the problem of accepting, sorting, tracking, forwarding, delivering, and correcting addresses of mail pieces in an efficient, cost-effective manner. For example, embodiments provide reduced mailing costs for mailers, reduced processing costs for mailing services, greater visibility into the mail stream for mailers, and a greater number of mail pieces reaching their intended destination.

Those of skill will recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

Applications Using the Intelligent Barcode

Embodiments of the intelligent barcode 10 described herein can be integrated into and improve various applications, systems, and services offered by the mailing service 420 and use of those systems by the mailer 410. In one embodiment, for example, the intelligent barcode 10 is used to validate systems designed to help mailers 410 identify inaccurate or incomplete addresses. Such systems include, but are not limited to, the "DPV® System" provided by the United States Postal Service. The DPV System according to one embodiment assists mailers 410 in obtaining accurate delivery address information and facilitates identification of erroneous addresses contained in mailer address files. Mailer use of DPV, and in particular use of the intelligent barcode 10 to validate the DPV System, can help to reduce the number of UAA pieces, which can in turn result in more efficient mail processing and delivery operations. In another embodiment, the intelligent barcode 10 is used to validate or confirm the quality of sorting services performed by the mailer 410. Thus, in one embodiment the intelligent barcode 10 is used to determine if the mailer 410 applied the finest depth of sort to mail pieces in a mailing, such as, for example, an 11-digit sort depth. In another embodiment, the mailing service 420 provides sorting validation and/or confirmation reports to the mailer 410.

In yet another embodiment where the mailing service 420 processes a mail piece with an automated processing system, the intelligent barcode 10 can be used to determine, for example, the length of time since a change of address form was sent to the mailing service 420, which can in turn be used to assess the accuracy of a particular mailer 410's sorting services and address information. One example of an automated processing system that can be improved using the intelligent barcode 10 is a mail redirection system, such as but not limited to the Postal Automated Redirection System, or "PARS," provided by the United States Postal Service. According to one embodiment, using the intelligent barcode 10 in PARS can improve the mailing service's performance by allowing the mailing service 420 to more quickly and accurately intercept and reroute forwardable mail during processing of that mail. In another embodiment, using the intelligent barcode 10 in PARS significantly reduces the time it takes forwardable mail pieces to get to a new address.

The intelligent barcode 10 can also be used to identify mail pieces that remain in the processing systems of the mailing service 420 for extended periods of time, also known as "loop" mail. The intelligent barcode 10 can also be used to resolve operational problems that may have led to extended processing times. In one embodiment, for example, the intelligent barcode 10 is used to identify mail pieces that have been processed multiple times on mail processing equipment, have been or are being processed for an extended time on mail processing equipment, and/or have extended counts on mail processing equipment. For example, the sorting module 108, the UAA processing module 110, the address correction module 112, and/or the mail forwarding module 114 described with reference to FIG. 10 can determine that a mail piece with a specific intelligent barcode 10 has been processed multiple times or has been processed for an extended time on mail processing equipment. In another embodiment, identification of "loop" mail using the intelligent barcode 10 allows the mailing service 420 to investigate and resolve operational problems in the mail processing system.

In yet another embodiment, the intelligent barcode 10 is used to identify forwarding or return instructions on labels. One example of labels containing forwarding or return instructions are yellow labels applied to mail pieces by forwarding operations and systems of the United States Postal Service. In still another embodiment, the intelligent barcode 10 is used to program mail processing equipment to identify the intelligent barcode 10 on a mail piece and use the intelligent barcode 10 for sorting when multiple barcodes are used on the mail piece. In yet a further embodiment, these additional identification capabilities minimize the amount of "loop" mail in the mail processing system.

The intelligent barcode 10 according to embodiments described herein can also be used to determine which operation or plant or processing station of the mailing service 420 processed a particular mail piece, as well as which optical character reader (OCR) or barcode sorter at the processing station scanned the mail piece. Such information can be used by the mailing service 420 for diagnostic purposes and to resolve operational problems with mail processing equipment.

In another embodiment, the intelligent barcode 10 is used by the mailing service 420 to enable additional or extra services. For example, the mailing service 420 can offer previously unavailable certified mail services, registered mail services, and return receipt services for letters and flats as a result of expanded capabilities and savings associated with use of the intelligent barcode 10. In one embodiment, the mailing service 420 offers additional services by expanding the list of available Service Type IDs the mailers 410 can use in the intelligent barcode 10.

According to some embodiments, the intelligent barcode 10 is used to determine what entities, businesses, and/or mailing systems are sending mail to a resident, or the mail recipient 470. For example, the intelligent barcode 10 can be used to identify that one or more mailers 410 are sending or have sent mail pieces to a particular resident, determine how many pieces are enroute to the resident, and provide this data to the resident in a notice or report to the resident. The notice and/or report may be in electronic or nonelectronic form. In another embodiment, the mailing service 420 uses intelligent barcode 10 scan data from mail processing equipment to determine where a mail piece entered the mail stream, or a "point of entry," and historical service performance for mail transmitted from one specific point, such as a point of entry, to another specific point, such as the mail recipient's address. In yet another embodiment, the intelligent barcode 10 is used to generate a mail profile that is sent to a mail recipient 470, outlining what mail pieces are expected to be or will be delivered to the mail recipient's mail box that day, the next day, or in the next week, etc. In still another embodiment, the intelligent barcode 10 is used to develop an industry profile that informs customers, such as the mail recipient 470, about the entities that have sent them mail pieces.

The intelligent barcode 10 can be used for advanced and expanded tracking and data collection services. According to one embodiment, for example, the intelligent barcode 10 is used to track reply pieces by mail processing plant in order to determine how many reply pieces are being returned to the mailer 410 from a specific geographic area. In another embodiment, this data is provided to the mailer 410 to allow it to determine and/or estimate response rates by geographic region. In yet another embodiment, return rate data based on geographic region is particularly useful to mailers 410 who use business reply mail. In still another embodiment, an eleven-digit delivery routing code in the intelligent barcode 10 is used by the mailing service 420 to provide volume and/or geographical data on business reply mail responses to a particular mailer 410. In yet a further embodiment, the intelligent barcode 10 is used to determine data, such as but not limited to date, time, location, serial number or mailing ID, for time and/or motion studies. The intelligent barcode 10 can also enable the mailing service 420 to provide data by geographic unit.

The intelligent barcode 10 can also be used to improve financial systems of the mailing service 420. Thus, for example, the intelligent barcode 10 can be used to automate accounting for business reply mail (BRM). In one embodiment, the mailing service 420 uses the intelligent barcode 10 and other scan data from mail processing equipment, including but not limited to a facing identification mark (FIM), to improve the efficiency of business reply mail. In another embodiment, the mailing service 420 uses the intelligent barcode 10 and FIMs to reduce business reply mail false positives. In yet another embodiment, the mailing service 420 uses mail processing scan data, including but not limited to a FIM, the eleven-digit delivery point code in the intelligent barcode 10, and data on the date and time a mail piece was scanned to calculate account deductions for BRM activity. In still another embodiment, the mailing service 420 develops a variation factor based on identified margins of error and applies the variation factor to the account deductions and/or BRM activity. In yet a further embodiment, the mailing service 420 uses the intelligent barcode 10 to enable prepaid First Class Mail or reply mail services.

In one embodiment, the intelligent barcode 10 is used by the mailing service 420 to change the service applied to a mail piece "on the fly," or during the time period in which the mail piece is being processed. Thus, for example, the mailing service 420 can offer a service to the mailer 410 that allows the mailer 410 to upgrade the class of mail of a mail piece from Standard to Priority, after the mailer 410 has transmitted the mail piece to the mailing service 420 and before the mail recipient 470 receives the mail piece. In one embodiment, the mailer 410 instructs the mailing service 420 to give a mail piece priority handling after the mail piece has already been transmitted to the mailing service 420. Embodiments of address correction and mail forwarding services described in greater detail above can be used to offer such an in-transmit change-of-service system to the mailer 410.

Embodiments of the intelligent barcode 10 described herein can be used to allow a mailer 410 to customize premium forwarding services provided by the mailing service 420. For example, the mailer 410 can use the intelligent barcode 10 to transmit forwarding instructions to the mailing service 420 based on a class or type of mail. In one embodiment, the mailer 410 uses the intelligent barcode 10 to transmit specific forwarding instructions to the mailing service 420 for different types or classes of the mailer's mail, such as but not limited to the mailer's bills, the mailer's First Class Mail, specific periodicals the mailer subscribes to, specific catalogs the mailer 410 expects to receive, and important documents the mailer 410 expects to receive. In another embodiment, the mailer 410 and/or the mail recipient 470 uses the intelligent barcode 10 to link forwarding instructions to a specific date the mailer 410 and/or the mail recipient 470 expects to return to an address.

In another embodiment, the intelligent barcode 10 is used to identify the share of work performed by mail processing equipment for a specific type of mail, such as but not limited to flats. In yet another embodiment, work share information enables the mailing service 420 to inject mail pieces at a different level of sortation, or to instruct mailers 410 to sort to a specific pass level, such as the first pass level.

The intelligent barcode 10 according to aspects described herein can serve as a coupon from a mailer 410, or as means for a customer to place an order. In one embodiment, the mailer 410 uses the intelligent barcode 10 as a unique identifier for a specific mail piece, enabling mailers 410 and, for example, participating vendors, to scan the intelligent barcode 10 on a mail piece as part of a coupon or advertisement offer. The mailer 410 can scan the intelligent barcode 10, then apply the coupon, discount, or advertisement offer, or the mailing service 420 can scan the intelligent barcode 10 and provide the scan data to the mailer 410, thereby allowing the mailer 410 to apply the coupon or other offer. In another embodiment, the mailer 410 identifies that an intelligent barcode 10 has been scanned, applies a coupon or other offer to a customer, then "invalidates" the specific scanned intelligent barcode 10 such that the customer cannot obtain a second coupon, discount, or offer using the same intelligent barcode 10. In yet another embodiment, the intelligent barcode 10 can serve as a second barcode on the mail piece to include literal data, or to enable direct look up or use.

In one embodiment, the intelligent barcode 10 is used to capture information and send data to a customer or mailer 410 in lieu of sending a mail piece to the customer or mailer 410. For example, in one embodiment, a mail recipient 470 transmits a business reply mail piece to the mailing service 420 and/or the mailer 410. The mailing service 420 scans the intelligent barcode 10, and, in one example, the origin confirm information identified in the intelligent barcode 10. The mailing service 420 then transmits the scanned data to the mailer 410, in lieu of transmitting the business reply mail piece to the mailer 410. In another embodiment, information scanned from the intelligent barcode 10 is used by the mailing service 420 to determine that the mailer 410 wishes scan data to be transmitted in lieu of the mail piece. Identifying the mailer's service request in the intelligent barcode 10 can initiate mail processing equipment at the mailing service 420 to perform an image capture and correlating OCR character read. The mailing service 420 can then provide this information to the mailer 410 in lieu of the physical mail piece, saving labor on data entry and in other respects.

Yet another application of the intelligent barcode 10 as described herein is detection of environmental hot spots. For example, chemically sensitive inks or paper can be used as a sensor and the mailing service 420 can be a reporting unit. In addition, the intelligent barcode 10 can be used to track deliveries of emergency drugs, such as but not limited to Cipro or iodine "Lick this" dots on letters.

The intelligent barcode 10 can also be used by the mailing service 420 to provide the mailer 410 with an acceptance scan by a mail carrier. Thus, for example, in one embodiment the mailer 410 places a mail piece with an intelligent barcode 10 in its mail box for transmittal to the mailing service 420 and a mail recipient 470. The mail carrier accepts the mail piece from the mail box and scans the intelligent barcode 10 on the mail piece. The mailing service 420 then transmits this scan data to the mailer 410, indicating to the mailer 410 that the mail piece has been accepted by the mail carrier. Additional scan data can also be provided to the mailer 410 as the mail piece is scanned at a mail processing facility and inducted into the mail stream, as described in greater detail above.

In addition, the intelligent barcode 10 can be used to sort mail in a mailer's mail box, or place "special mail" at the top of a plurality of mail pieces placed in the mailer's mail box by a mail carrier. In one embodiment, the mailing service 420 offers a Service Type ID for use in the intelligent barcode 10 to allow the mailer 410 to request special mail box sorting services. In another embodiment, the mailing service 420 modifies a delivery point sequence (DPS) sort plan of an automated mail processing system to recognize the mail box-sort Service Type ID and sort mail pieces in a priority sequence. In yet another embodiment, the mailing service 420 trains mail carriers on handling and placement of mail box-sorted mail pieces in mail boxes.

Embodiments of the intelligent barcode 10 described herein can be used for advanced delivery services. In one embodiment, a mail carrier scans a parcel with an intelligent barcode 10. The scan initiates a link to a GPS location and/or provides routing directions to complete the delivery. In another embodiment, the intelligent barcode 10 is used in conjunction with a scan device equipped with GPS capability to enable mail carriers to scan an 11-digit delivery point code in the intelligent barcode 10 on a mail piece or parcel. The scan device provides a GPS XY coordinate, which is used with geographic information system (GIS) mapping software to pinpoint delivery addresses using, for example, a database. This is in contrast to conventional algorithms currently used in mapping technologies such as Google™Maps and Mapquest® that provide coordinates based on street addresses. In yet another embodiment, the intelligent barcode 10 is used to replace a fixed MSP point, such as randomize location or a virtual MSP. The intelligent barcode 10 can also be used to develop an international monitoring service and product.

Various embodiments, functions, services, and applications using the intelligent barcode 10 are described herein. It will be appreciated that those functions, services, and applications can in one embodiment be implemented by a system comprising one or more computer systems and/or databases that receive intelligent barcode data and other mail processing data from any suitable mail processing equipment or mail processing system. For example, embodiments of the intelligent barcode services and applications described herein can be implemented using a computer system, such as the computer system 1500 and/or the processor 1502 illustrated in FIG. 15.

While the above detailed description has shown, described, and pointed out novel features of the development as applied to various embodiments, it will be understood that various omissions, substitutions, and changes in the form and details of the device or process illustrated may be made by those skilled in the art without departing from the spirit of the invention. As will be recognized, the development may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A computerized method of sorting mail comprising:
    reading by a processor encoded data located on the mail piece, wherein the encoded data includes a recipient, a recipient delivery point, and handling data;
    decoding the encoded data to determine an identifier for a name of a recipient of the mail piece, handling instructions, and an identifier for a sender of the mail piece;
    identifying an account associated with the sender of the mail piece based on the identifier of the sender;
    determining by a processor that the mail piece is an undeliverable as addressed mail piece;
    performing the following operation in response to determining that the mail piece is an undeliverable as addressed mail piece:
    requesting payment from the sender of the mail piece according to the handling instructions;
    determining a final disposition of the mail piece;
    disposing of the mail piece in accordance with the determined final disposition; and,
    executing the handling instructions to deliver data associated with the undeliverable as addressed mail piece to the recipient.

2. The computerized method of claim 1, wherein decoding the encoded data comprises decoding the encoded data to determine an identification of a recipient of the mail piece, and wherein determining a final disposition of the mail piece comprises:
    retrieving a name of the recipient of the mail piece using the identification of the recipient of the mail piece from the encoded data; and
    confirming that the mail piece is an undeliverable as addressed mail piece, using the name of the recipient of the mail piece.

3. The computerized method of claim 1, wherein decoding the encoded data comprises decoding the encoded data to determine an identification of a delivery point for the mail piece and an identification of a recipient of the mail piece, and wherein determining that the mail piece is an undeliverable as addressed comprises determining whether the mail piece is undeliverable as addressed using the identification of the delivery point for the mail piece and the identification of the recipient of the mail piece from the encoded data.

4. The computerized method of claim 2, wherein retrieving the name of the recipient of the mail piece comprises performing a lookup into a database of names of recipients of the mail pieces using an identification and return address of the sender of the mail piece and the identification of the recipient of the mail piece.

5. The computerized method of claim 4, wherein the database is stored in a machine-readable medium that is remote relative to where operations of the computerized method occur.

6. The computerized method of claim 5, wherein the machine-readable medium is under the control of the sender of the mail piece.

7. The computerized method of claim 4, wherein the names of the recipients stored in the database are encrypted, and wherein retrieving the name of the recipient of the mail piece comprises decrypting the name of the recipient of the mail piece prior to confirming that the mail piece is an undeliverable as addressed mail piece.

8. The computerized method of claim 1, wherein the final disposition of the mail piece that is undeliverable as addressed comprises returning the mail piece to a sender of the mail piece, forwarding the mail piece to a different address, or treating the mail piece as waste.

9. The computerized method of claim 1, further comprising performing the following operation in response to determining that the mail piece is an undeliverable as addressed mail piece:
    transmitting, to a mailer of the mail piece, at least one of the encoded data of the mail piece, a destination address for the mail piece, a name of a recipient for the mail piece, a delivery point bar code for the mail piece, a final disposition of the mail piece, a new destination address for the mail piece or a new destination delivery point bar code.

10. The computerized method of claim 1, wherein sorting the mail comprises sorting mail for a plurality of mail pieces, the computerized method further comprising:
    sorting the plurality of mail pieces;
    storing, for the number of mail pieces that are sorted and by identification of mailers of the number of mail pieces, in a machine-readable medium, data for the number of mail pieces that includes the encoded data, wherein the data for the number of mail pieces is accessible from the machine-readable medium using the encoded data, wherein the data stored in the machine-readable medium is accessible by a mail sorter at a mail sorting facility; and
    updating, by mailers of the number of mail pieces, the data for the number of mail pieces stored in the machine-readable medium.

11. The computerized method of claim 10, further comprising:
    retrieving the data for one of the number of mail pieces from the machine-readable medium;
    performing final disposition of the one of the number of mail pieces using the retrieved data; and
    sorting the one of the number of mail pieces based on the final disposition of the mail piece.

12. The computerized method of claim 1, further comprising performing the following operation in response to determining that the mail piece is a candidate undeliverable as addressed mail piece:
    applying the identification of the class of the mail piece to the mail piece, in response to a determination that the mail piece can not be confirmed as an undeliverable as addressed mail piece.

13. The computerized method of claim 1, further comprising performing the following operation in response to determining that the mail piece is undeliverable as addressed:
    applying the identification of the class of the mail piece to the mail piece, in response to a determination that a final disposition cannot be performed on the mail piece.

14. A machine-readable medium including instructions which when executed by a machine causes the machine to perform mail sorting operations comprising:
    reading encoded data located on the mail piece;
    decoding the encoded data to determine an identification of a sender of the mail piece, an identification of a recipient of the mail piece, handling information, and an identifier for a sender of the mail piece;
    identifying an account associated with the sender of the mail piece based on the identifier of the sender;
    determining whether the mail piece is a candidate undeliverable as addressed mail piece using the identification of the recipient of the mail piece within the encoded data and an identification of a delivery point for the mail piece;
    performing the following operations in response to determining that the mail piece is a candidate undeliverable as addressed mail piece:
        retrieving a name of the recipient of the mail piece using the identification of the recipient of the mail piece within the encoded data;
        retrieving a return address of the sender of the mail piece using the identification of the sender of the mail piece within the encoded data;
        confirming that the candidate undeliverable as addressed mail piece is an undeliverable as addressed mail piece, using the name of the recipient of the mail piece;
        requesting payment from the sender of the mail piece according to the handling instructions; and
        determining final disposition of the mail piece;
    disposing of the mail piece in accordance with the determined final disposition; and,
    executing the handling instructions to deliver data associated with the undeliverable as addressed mail piece to the recipient.

15. The machine-readable medium of claim 14, wherein retrieving the name of the recipient of the mail piece comprises performing a lookup into a database of names of recipients of the mail pieces using the identification of the sender of the mail piece and the identification of the recipient of the mail piece.

16. The machine-readable medium of claim 15, wherein the database is stored in a machine-readable medium that is remote relative to where operations of the computerized method occur.

17. The machine-readable medium of claim 16, wherein the machine-readable medium is under the control of the sender of the mail piece.

18. The machine-readable medium of claim 15, wherein the names of the recipients stored in the database are encrypted, and wherein retrieving the name of the recipient of the mail piece comprises decrypting the name of the recipient of the mail piece prior to confirming that the candidate undeliverable as address mail piece is an undeliverable as addressed mail piece.

19. The machine-readable medium of claim 14, wherein retrieving the return address of the sender of the mail piece comprises performing a lookup into a database of return addresses of senders of the mail pieces using the identification of the sender of the mail piece.

20. The machine-readable medium of claim 14, wherein operations for sorting the mail are executed by at least one of a letter mail sorter, a mixed mail sorter, a flat mail sorter or a parcel mail sorter.

21. The machine-readable medium of claim 14, wherein operations for sorting the mail are executed in a single pass mail sort operation.

22. An apparatus comprising:
a database configured to store a number of entries, wherein each entry of the number of entries includes a name of a recipient of mail and an identification corresponding to encoded data associated with the name of the recipient;
a mail sorter configured to read the encoded data located on a candidate undeliverable as addressed mail piece, the encoded data comprising an identification of the recipient of the candidate undeliverable as addressed mail piece, handling instructions of the candidate undeliverable as addressed mail piece, and an identifier for a sender of the mail piece;
wherein the mail sorter is configured to use the encoded data to retrieve, from the database, a name of the recipient of the candidate undeliverable as addressed mail piece from an entry of the number of entries that includes the identification of the recipient of the candidate undeliverable as addressed mail piece,
wherein the mail sorter is configured to confirm that the candidate undeliverable as addressed mail piece is an undeliverable as addressed mail piece, using the name of the recipient of the candidate undeliverable as addressed mail piece,
wherein the mail sorter is configured to identify an account associated with the sender of the candidate undeliverable as addressed mail piece based on the identifier of the sender;
wherein the mail sorter is configured to determine a final disposition of the confirmed undeliverable as addressed mail piece; and
wherein the mail sorter is configured to execute the handling instructions to request payment from the sender of the candidate undeliverable as addressed mail piece and to deliver data associated with the undeliverable as addressed mail piece to the recipient.

23. The apparatus of claim 22, wherein the mail sorter comprises at least one of a letter mail sorter, a mixed mail sorter, a flat mail sorter or a parcel mail sorter.

24. The apparatus of claim 22, wherein each entry of the number of entries is encrypted, and wherein the mail sorter is configured to decrypt the name of the recipient of the mail piece prior to confirmation that the candidate undeliverable as address mail piece is an undeliverable as addressed mail piece.

25. The apparatus of claim 22, wherein the mail sorter is configured to read the encoded data, to retrieve the name of the recipient, and to determine the final disposition in a single pass mail sort operation.

26. The apparatus of claim 22, wherein the final disposition of the mail piece that is undeliverable as addressed comprises returning the mail piece to a sender of the mail piece, forwarding the mail piece to a different address, or treating the mail piece as waste.

27. A computerized method of sorting mail comprising:
reading encoded data located on the mail piece, wherein the encoded data includes recipient information, sender information, and handling data;
decoding the encoded data to determine the identification of the recipient, handling instructions, and an identification of the sender of the mail piece; wherein the handling instructions comprise:
identifying an account associated with the sender of the mail piece based on the identifier of the sender; and
requesting payment from the account associated with the sender of the mail piece;
executing the handling instructions to deliver data associated with the undeliverable as addressed mail piece to the recipient.

28. A machine-readable medium including instructions which when executed by a machine causes the machine to perform mail sorting operations comprising:
reading encoded data located on the mail piece, wherein the encoded data includes recipient information, sender information, and handling data;
decoding the encoded data to determine the identification of the recipient, handling instructions, and an identification of the sender of the mail piece; wherein the handling instructions comprise:
identifying an account associated with the sender of the mail piece based on the identifier of the sender; and
requesting payment from the account associated with the sender of the mail piece;
executing the handling instructions to deliver data associated with the undeliverable as addressed mail piece to the recipient.

* * * * *

UNITED STATES PATENT AND TRADEMARK OFFICE
CERTIFICATE OF CORRECTION

| | | |
|---|---|---|
| PATENT NO. | : 8,598,482 B2 | Page 1 of 1 |
| APPLICATION NO. | : 12/405139 | |
| DATED | : December 3, 2013 | |
| INVENTOR(S) | : Bonnell et al. | |

It is certified that error appears in the above-identified patent and that said Letters Patent is hereby corrected as shown below:

In the Specification

At Column 10, Line 43, change "filed" to -- field --

At Column 10, Line 45, change "filed" to -- field --

At Column 10, Line 46, change "filed" to -- field --

At Column 14, Line 42, change "filed" to -- field --

At Column 14, Line 44, change "filed" to -- field --

At Column 23, Line 48, after "processing" delete "L"

Signed and Sealed this
Nineteenth Day of August, 2014

Michelle K. Lee
*Deputy Director of the United States Patent and Trademark Office*